United States Patent
Wang

(10) Patent No.: US 9,191,660 B2
(45) Date of Patent: Nov. 17, 2015

(54) STEREOSCOPIC PROJECTION DEVICE AND DISPLAY METHOD THEREOF

(71) Applicant: DELTA ELECTRONICS, INC., Taoyuan Hsien (TW)

(72) Inventor: Yu-Chang Wang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 345 days.

(21) Appl. No.: 13/869,438

(22) Filed: Apr. 24, 2013

(65) Prior Publication Data

US 2014/0184756 A1    Jul. 3, 2014

(30) Foreign Application Priority Data

Dec. 28, 2012   (TW) .............................. 101150855 A

(51) Int. Cl.
*H04N 13/04* (2006.01)
*H04N 9/31* (2006.01)

(52) U.S. Cl.
CPC ......... *H04N 13/0459* (2013.01); *H04N 9/3111* (2013.01); *H04N 13/0438* (2013.01)

(58) Field of Classification Search
CPC .......... H04N 13/0459; H04N 13/0438; H04N 9/3111
USPC .......................................................... 348/51
See application file for complete search history.

(56) References Cited

U.S. PATENT DOCUMENTS

| | | | |
|---|---|---|---|
| 2002/0003766 A1* | 1/2002 | Kadowaki et al. | 369/112.07 |
| 2008/0180640 A1* | 7/2008 | Ito | 353/31 |
| 2013/0016323 A1 | 1/2013 | Huang | |

FOREIGN PATENT DOCUMENTS

CN    102253581 A    11/2011

* cited by examiner

*Primary Examiner* — Michael Lee
(74) *Attorney, Agent, or Firm* — Hauptman Ham, LLP

(57) ABSTRACT

A stereoscopic projection device includes a plurality of light source modules, a dichroic mirror, a first optical module, a second optical module, and a beam-combining prism. Each light source module includes a plurality of light sources used for providing light beams and a prism module used for collecting the light beams. The light beams propagate at different angles after passing through the prism module. The light source modules are disposed on different sides of the dichroic mirror. The dichroic mirror is used for guiding portions of the light beams to a first optical path, and guiding other portions of the light beams to a second optical path. The first and second optical modules disposed on the first and second optical path are used for guiding and modulating the light beams passing along the first and second optical paths and forming first and second image light beams with different images.

18 Claims, 15 Drawing Sheets

STEREOSCOPIC PROJECTION DEVICE AND DISPLAY METHOD THEREOF

RELATED APPLICATIONS

This application claims priority to Taiwan Application Serial Number 101150855, filed Dec. 28, 2012, which is herein incorporated by reference.

BACKGROUND

1. Technical Field

The present disclosure relates to a stereoscopic projection device.

2. Description of Related Art

Exploiting the binocular parallax of humans, a stereoscopic display provides two different images respectively to the two eyes of an observer, such that the observer can experience a stereoscopic image. Unlike other kinds of stereoscopic displays which require the use of special glasses to distinguish between left-eye and right-eye images, the autostereoscopic display provides a plurality of images by using a plurality of light sources, in which the images are projected to different spatial positions. The eyes of an observer can receive different images such that the observer perceives a stereoscopic image when his or her eyes correspond to any two of the spatial positions respectively.

Since the autostereoscopic display is able to avoid the inconvenience of stereoscopic display technology, it has become an important and developing technology in recent times. The light sources of conventional autostereoscopic displays typically are projectors. However, since a plurality of such projectors are used to provide an image in a conventional autostereoscopic display, this results in an overall large size and high cost for the display. Moreover, in the slit switch light field technology, images in non-working views must be blocked, resulting in the efficiency of the display being inversely proportional to the number of the views. Therefore, a large size of the autostereoscopic display is hard to achieve due to the unexpected loss of brightness.

SUMMARY

An aspect of the present invention provides a stereoscopic projection device, in which a high-speed image modulator and light sources are assembled together, and further used in conjunction with a light beam splitting and combining system. Therefore, the stereoscopic projection device can be applied to a multi-view stereoscopic display field.

A stereoscopic projection device includes a first light source module, a second light source module, a dichroic mirror, a first optical module, a second optical module, and a beam-combining prism. The first light source module includes a first light source, a second light source, and a first prism module. The first light source is used for providing a first light beam. The second light source is used for providing a second light beam. The first prism module is used for collecting the first light beam and the second light beam. The first light beam and second light beam emit at different angles after passing through the first prism module. The second light source module includes a third light source, a fourth light source, and a second prism module. The third light source is used for providing a third light beam. The fourth light source is used for providing a fourth light beam. The second prism module is used for collecting the third light beam and the fourth light beam. The third light beam and the fourth light beam emit at different angles after passing through the second prism module. The first light source module and the second light source module are respectively disposed at different sides of the dichroic mirror. The dichroic mirror is used for splitting the first light beam, the second light beam, the third light beam, and the fourth light beam into first portions and second portions, guiding the first portions of the first light beam, the second light beam, the third light beam, and the fourth light beam to a first optical path, and guiding the second portions of the first light beam, the second light beam, the third light beam, and the fourth light beam to a second optical path. The first optical module is disposed on the first optical path for guiding and modulating the first portions of the first light beam, the second light beam, the third light beam, and the fourth light beam passing along the first optical path to form a plurality of first image light beams with different images. The second optical module is disposed on the second optical path for guiding and modulating the second portions of the first light beam, the second light beam, the third light beam, and the fourth light beam passing along the second optical path to form a plurality of second image light beams with different images. The beam-combining prism is used for guiding the first image light beams and the second image light beams to a lens.

In one or more embodiments, the first prism module optionally includes a first prism and a second prism. The first prism has a first incident surface and a first light emitting surface. The second prism has a second incident surface and a first reflective surface. The first prism and the second prism define a first gap therebetween. The first light beam is incident to the first prism module from the first incident surface, and is reflected to the first light emitting surface by the first gap. The second light beam is incident to the first prism module from the second incident surface, is reflected by the first reflective surface, passes through the first gap, and reaches the first light emitting surface. An angle between the first light beam and a normal line of the first gap and an angle between the second light beam and the normal line of the first gap are different.

In one or more embodiments, an angle between the first reflective surface and the first gap is optionally between 0 degrees and 10 degrees.

In one or more embodiments, the second prism module optionally includes a third prism and a fourth prism. The third prism has a third incident surface and a second light emitting surface. The fourth prism has a fourth incident surface and a second reflective surface. The third prism and the fourth prism define a second gap therebetween. The third light beam is incident to the second prism module from the third incident surface, and is reflected to the second light emitting surface by the second gap. The fourth light beam is incident to the second prism module from the fourth incident surface, is reflected by the second reflective surface, passes through the second gap, and reaches the second light emitting surface. An angle between the third light beam and a normal line of the second gap and an angle between the fourth light beam and the normal line of the second gap are different.

In one or more embodiments, an angle between the second reflective surface and the second gap is optionally between 0 degrees and 10 degrees.

In one or more embodiments, the first light source module optionally further includes a fifth light source for providing a fifth light beam. The first prism module is optionally further for collecting the first light beam, the second light beam, and the fifth light beam. The first light beam, the second light beam, and the fifth light beam emit at different angles after passing through the first prism module. The second light source module optionally further includes a sixth light source for providing a sixth light beam. The second prism module is optionally further for collecting the third light beam, the fourth light beam, and the sixth light beam. The third light beam, the fourth light beam, and the sixth light beam emit at different angles after passing through the second prism module. The dichroic mirror is optionally further for guiding portions of the fifth light beam and the sixth light beam to the first optical path, and guiding other portions to the second optical path. The first optical module is optionally further for guiding and modulating the portions of the fifth light beam and the sixth light beam passing along the first optical path to form the first image light beams. The second optical module is optionally further for guiding and modulating the other portions of the fifth light beam and the sixth light beam to form the second image light beams.

In one or more embodiments, the first prism module optionally includes a first prism, a second prism, and a fifth prism. The first prism has a first incident surface and a first light emitting surface. The second prism has a second incident surface, and the first prism and the second prism define a first gap therebetween. The fifth prism has a fifth incident surface and a first reflective surface, and the second prism and the fifth prism define a third gap therebetween. The first light beam is incident to the first prism module from the first incident surface, and is reflected to the first light emitting surface by the first gap. The second light beam is incident to the first prism module from the second incident surface, is reflected by the third gap, passes through the first gap, and reaches the first light emitting surface. The fifth light beam is incident to the first prism module from the fifth incident surface, is reflected by the first reflective surface, passes through the third gap and the first gap, and reaches the first light emitting surface. An angle between the first light beam and a normal line of the first gap, an angle between the second light beam and the normal line of the first gap, and an angle between the fifth light beam and the normal line of the first gap are different.

In one or more embodiments, an angle between the first gap and the third gap is optionally between 0 degrees and 20/3 degrees, and an angle between the first reflective surface and the third gap is optionally between 0 degrees and 20/3 degrees.

In one or more embodiments, the second prism module optionally includes a third prism, a fourth prism, and a sixth prism. The third prism has a third incident surface and a second light emitting surface. The fourth prism has a fourth incident surface, and the third prism and the fourth prism define a second gap therebetween. The sixth prism has a sixth incident surface and a second reflective surface, and the fourth prism and the sixth prism define a fourth gap therebetween. The third light beam is incident to the second prism module from the third incident surface, and is reflected to the second light emitting surface by the second gap. The fourth light beam is incident to the second prism module from the fourth incident surface, is reflected by the fourth gap, passes through the second gap, and reaches the second light emitting surface. The sixth light beam is incident to the second prism module from the sixth incident surface, is reflected by the second reflective surface, passes through the fourth gap and the second gap, and reaches the second light emitting surface. An angle between the third light beam and a normal line of the second gap, an angle between the fourth light beam and the normal line of the second gap, and an angle between the sixth light beam and the normal line of the second gap are different.

In one or more embodiments, an angle between the second gap and the fourth gap is optionally between 0 degrees and 20/3 degrees, and an angle between the second reflective surface and the fourth gap is optionally between 0 degrees and 20/3 degrees.

In one or more embodiments, the first optical module optionally includes a first reflector, a first image modulator, and a first prism group. The first reflector is used for reflecting the first portions of the first light beam, the second light beam, the third light beam, and the fourth light beam propagating from the dichroic mirror to the first prism group. The first image modulator is used for modulating the first portions of the first light beam, the second light beam, the third light beam, and the fourth light beam to be the first image light beams. The first prism group is used for guiding the first portions of the first light beam, the second light beam, the third light beam, and the fourth light beam propagating from the first reflector to the first image modulator, and guiding the first image light beams to the beam-combining prism.

In one or more embodiments, the first optical module optionally further includes a first relay lens and a second relay lens. The first relay lens is disposed between the dichroic mirror and the first reflector. The second relay lens is disposed between the first reflector and the first prism group.

In one or more embodiments, the first relay lens is optionally divided into a first half portion and a second half portion. The first portions of the first light beam and the second light beam propagating from the dichroic mirror pass through the first half portion of the first relay lens, and the first portions of the third light beam and the fourth light beam propagating from the dichroic mirror pass through the second half portion of the first relay lens.

In one or more embodiments, the second optical module optionally includes a second reflector, a second image modulator, and a second prism group. The second reflector is used for reflecting the second portions of the first light beam, the second light beam, the third light beam, and the fourth light beam propagating from the dichroic mirror to the second prism group. The second image modulator is used for modulating the second portions of the first light beam, the second light beam, the third light beam, and the fourth light beam to be the second image light beams. The second prism group is used for guiding the second portions of the first light beam, the second light beam, the third light beam, and the fourth light beam propagating from the second reflector to the second image modulator, and guiding the second image light beams to the beam-combining prism.

In one or more embodiments, the second optical module optionally further includes a third relay lens and a fourth relay lens. The third relay lens is disposed between the dichroic mirror and the second reflector. The fourth relay lens is disposed between the second reflector and the second prism group.

In one or more embodiments, the third relay lens is optionally divided into a third half portion and a fourth half portion. The second portions of the first light beam and the second light beam propagating from the dichroic mirror pass through the third half portion of the third relay lens, and the second portions of the third light beam and the fourth light beam propagating from the dichroic mirror pass through the fourth half portion of the third relay lens.

Another aspect of the present invention provides a display method including a plurality of steps, as will be outlined below. It is noted that the steps are not recited in the sequence in which the steps are performed. That is, unless the sequence of the steps is expressly indicated, the sequence of the steps is interchangeable, and all or part of the steps may be simultaneously, partially simultaneously, or sequentially performed.

A plurality of light beams at different angles are emitted in time sequence. The light beams are split by a dichroic mirror. Portions of the light beams are guided to a first optical path, and other portions of the light beams are guided to a second optical path. The portions of the light beams passing along the first optical path are modulated to form a plurality of first image light beams with different images, and the other portions of the light beams passing along the second optical path are modulated to form a plurality of the second image light beams with different images. The first image light beams and the second image light beams are then projected to a screen.

In one or more embodiments, the display method optionally further includes making each of the light beams uniform.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
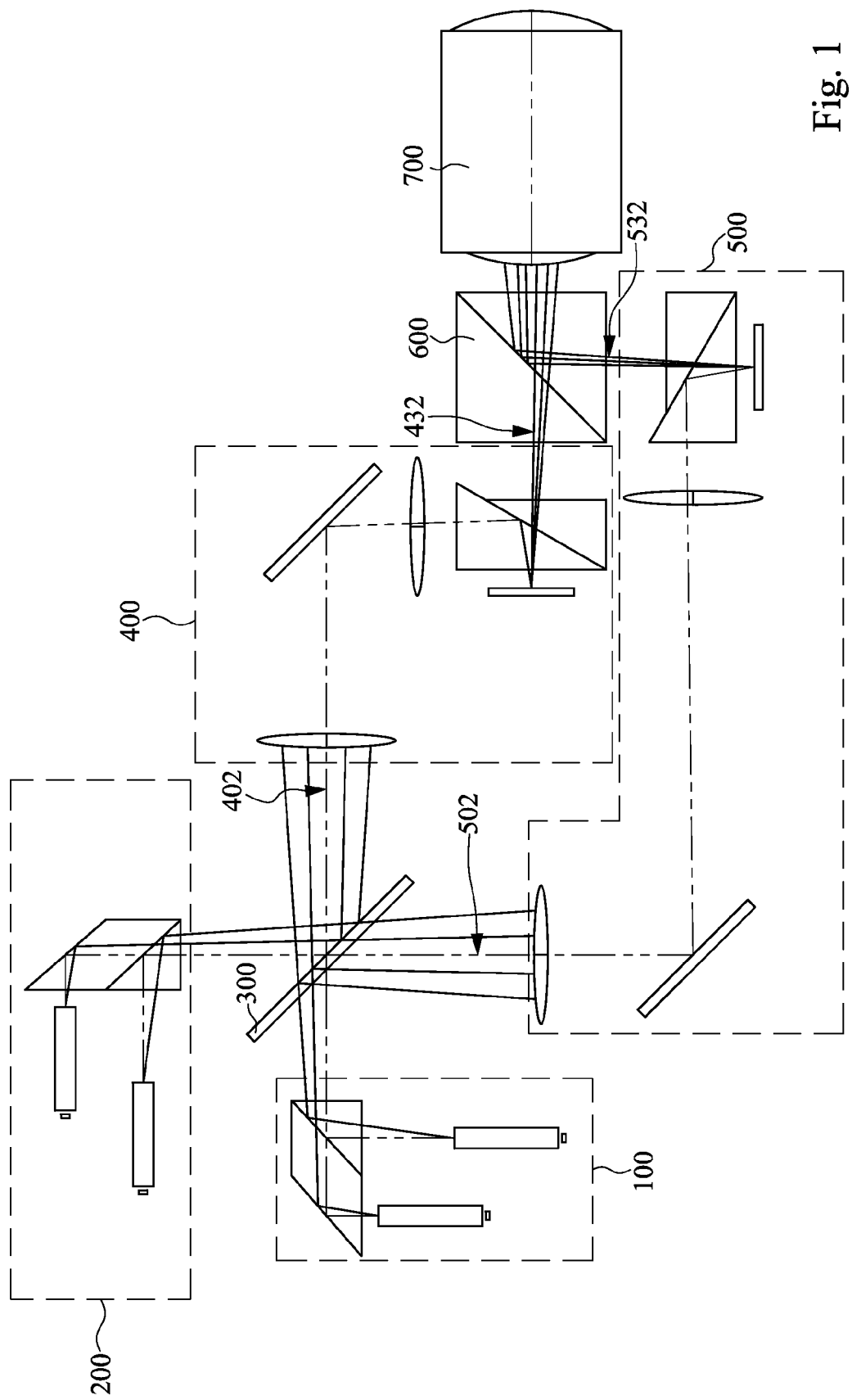
FIG. 1 is a schematic diagram of a stereoscopic projection device according to one embodiment of the present invention.

FIG. 1 is a schematic diagram of a stereoscopic projection device according to one embodiment of the present invention. The stereoscopic projection device includes a first light source module 100, a second light source module 200, a dichroic mirror 300, a first optical module 400, a second optical module 500, and a beam-combining prism 600. Each of the first light source module 100 and the second light source module 200 includes a plurality of light sources which provide light beams, respectively. The light beams of the first light source module 100 propagate at different angles after passing through the first light source module 100, and the light beams of the second light source module 200 propagate at different angles after passing through the second light source module 200. The first light source module 100 and the second light source module 200 are disposed at different sides of the dichroic mirror 300. The dichroic mirror 300 is used for splitting the light beams into first portions and second portions. The first portions of the light beams are guided to a first optical path 402 by the dichroic mirror 300, while the second portions of the light beams are guided to a second optical path 502 by the dichroic mirror 300. The light beams passing along the first optical path 402 are guided and modulated by the first optical module 400 to form first image light beams 432 with different images. The light beams passing along the second optical path 502 are guided and modulated by the second optical module 500 to be second image light beams 532 with different images. The beam-combining prism 600 is used for emitting the first image light beams 432 and the second image light beams 532 toward a lens 700, and the lens 700 then projects the first image light beams 432 and the second image light beams 532 to different view fields. Therefore, as long as the light sources of the first light source module 100 and the second light source module 200 are turned on in time sequence, the light beams can propagate in the stereoscopic projection device at different angles, and be projected to a screen to obtain a plurality of images at different view fields.

Figure 2:
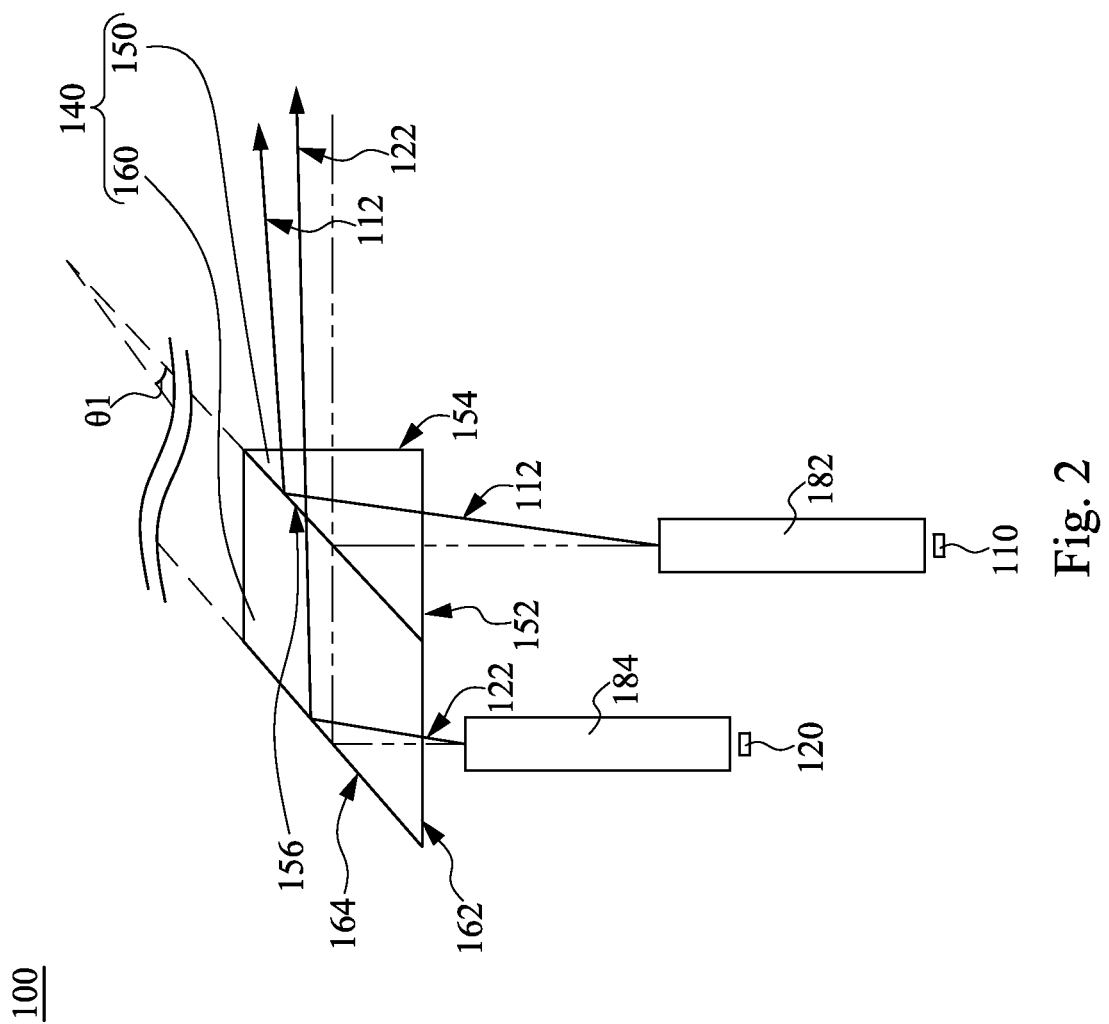
FIG. 2 is a schematic diagram of a first light source module of FIG. 1.

FIG. 2 is a schematic diagram of the first light source module 100 of FIG. 1. The first light source module 100 includes a first light source 110, a second light source 120, and a first prism module 140. The first light source 110 is used for providing a first light beam 112, and the second light source 120 is used for providing a second light beam 122. The first prism module 140 is used for collecting the first light beam 112 and the second light beam 122. The first light beam 112 and the second light beam 122 emit at different angles after passing through the first prism module 140. The first light source 110 and the second light source 120 may be solid-state light sources, such as light emitting diode light sources. However, this should not limit the claimed scope of the present invention.

In one or more embodiments, the first prism module 140 may include a first prism 150 and a second prism 160. The first prism 150 has a first incident surface 152 and a first light emitting surface 154. The second prism 160 has a second incident surface 162 and a first reflective surface 164. The first prism 150 and the second prism 160 define a first gap 156 therebetween, and the first gap 156 may be an air gap. An interface between the air and the prism has a total internal reflection angle. A light beam passes through the first gap 156 if the light beam is incident to the first gap 156 at an angle smaller than the total internal reflection angle, while the light beam is reflected at the first gap 156 if the light beam is incident to the first gap 156 at an angle larger than the total internal reflection angle. Additionally, the first reflective surface 164 may have a total internal reflection angle. The second light beam 122 can be incident to the first reflective surface 164 at an angle larger than the total internal reflection angle of the first reflective surface 164, such that the second light beam 122 can be reflected by the first reflective surface 164.

The first light beam 112 is incident to the first prism module 140 from the first incident surface 152, and is incident to the first gap 156 at an angle larger than the total internal reflection angle of the interface of the first gap 156. The first light beam 112 is then reflected by the first gap 156 and reaches the first light emitting surface 154. The second light beam 122 is incident to the first prism module 140 from the second incident surface 162, then is reflected by the first reflective surface 164, and is incident to the first gap 156 at an angle smaller than the total internal reflection angle of the interface of the first gap 156. The second light beam 122 then passes through the first gap 156 and reaches the first light emitting surface 154. In summary, since an angle between the first light beam 112 and a normal line of the first gap 156 and an angle between the second light beam 122 and the normal line of the first gap 156 are different, the first light beam 112 and the second light beam 122 can emerge from the first light emitting surface 154 at different angles, and then be modulated to form different images corresponding to different view fields.

An angle θ1 between the first reflective surface 164 and the first gap 156 can be designed as an angle between 0 degrees and 10 degrees, such that the angle between the first light beam 112 and the normal line of the first gap 156 is larger than the total internal reflection angle of the interface of the first gap 156, and the angle between the second light beam 122 and the normal line of the first gap 156 is smaller than the total internal reflection angle of the interface of the first gap 156. Therefore, the first light beam 112 can be reflected by the first gap 156, while the second light beam 122 can be reflected by the first reflective surface 164 and then pass through the first gap 156. However, this should not limit the claimed scope of the present invention. In one or more embodiments, the first light source module 100 may further include light tunnels 182 and 184 for making uniform the first light beam 112 emitted from the first light source 110 and the second light beam 122 emitted from the second light source 120, respectively, to improve the quality of the first and second light beams 112, 120.

Figure 3:
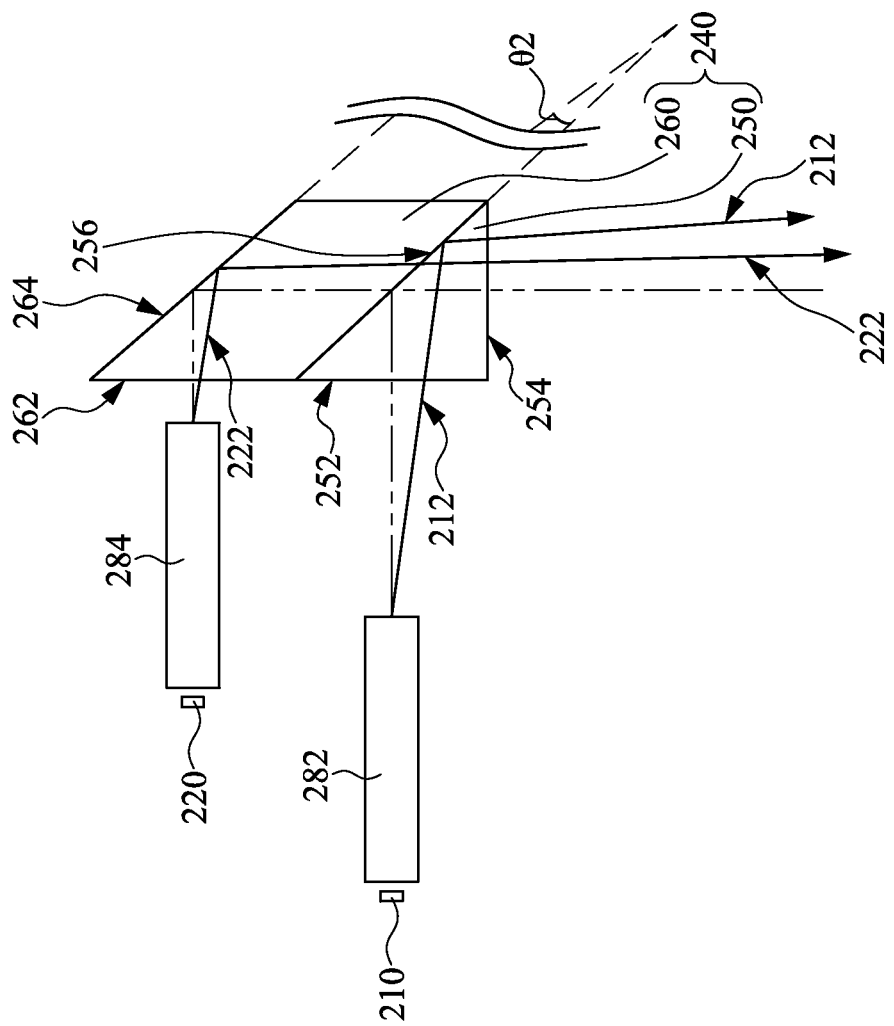
FIG. 3 is a schematic diagram of a second light source module of FIG. 1.

FIG. 3 is a schematic diagram of the second light source module 200 of FIG. 1. The second light source module 200 includes a third light source 210, a fourth light source 220, and a second prism module 240. The third light source 210 is used for providing a third light beam 212, and the fourth light source 220 is used for providing a fourth light beam 222. The second prism module 240 is used for collecting the third light beam 212 and the fourth light beam 222. The third light beam 212 and the fourth light beam 222 emit at different angles after passing through the second prism module 240. The third light source 210 and the fourth light source 220 may be a solid-state light sources, such as light emitting diode light sources. However, this should not limit the claimed scope of the present invention.

In one or more embodiments, the second prism module 240 may include a third prism 250 and a fourth prism 260. The third prism 250 has a third incident surface 252 and a second light emitting surface 254. The fourth prism 260 has a fourth incident surface 262 and a second reflective surface 264. The third prism 250 and the fourth prism 260 define a second gap 256 therebetween, and the second gap 256 may be an air gap. Additionally, the second reflective surface 264 may have a total internal reflection angle. The fourth light beam 222 can be incident to the second reflective surface 264 at an angle larger than the total internal reflection angle of the second reflective surface 264, such that the fourth light beam 222 can be reflected by the second reflective surface 264.

The third light beam 212 is incident to the second prism module 240 from the third incident surface 252, and is incident to the second gap 256 at an angle larger than the total internal reflection angle of the interface of the second gap 256. The third light beam 212 is then reflected by the second gap 256 and reaches the second light emitting surface 254. The fourth light beam 222 is incident to the second prism module 240 from the fourth incident surface 262, then is reflected by the second reflective surface 264, and is incident to the second gap 256 at an angle smaller than the total internal reflection angle of the interface of the second gap 256. The fourth light beam 222 then passes through the second gap 256 and reaches the second light emitting surface 254. In summary, since an angle between the third light beam 212 and a normal line of the second gap 256 and an angle between the fourth light beam 222 and the normal line of the second gap 256 are different, the third light beam 212 and the fourth light beam 222 can emerge from the second light emitting surface 254 at different angles, and then be modulated to different images corresponding to different view fields.

An angle θ2 between the second reflective surface 264 and the second gap 256 can be designed as an angle between 0 degrees and 10 degrees, such that the angle between the third light beam 212 and the normal line of the second gap 256 is larger than the total internal reflection angle of the interface of the second gap 256, and the angle between the fourth light beam 222 and the normal line of the second gap 256 is smaller than the total internal reflection angle of the interface of the second gap 256. Therefore, the third light beam 212 can be reflected by the second gap 256, and the fourth light beam 222 can be reflected by the second reflective surface 264 and then pass through the second gap 256. However, this should not limit the claimed scope of the present invention. In one or more embodiments, the second light source module 200 may further include light tunnels 282 and 284 for making the third light beam 212 emitted from the third light source 210 and the fourth light beam 222 emitted from the fourth light source 220 uniform, respectively, to improve the quality of the third and fourth light beams 212, 222.

Figure 4:
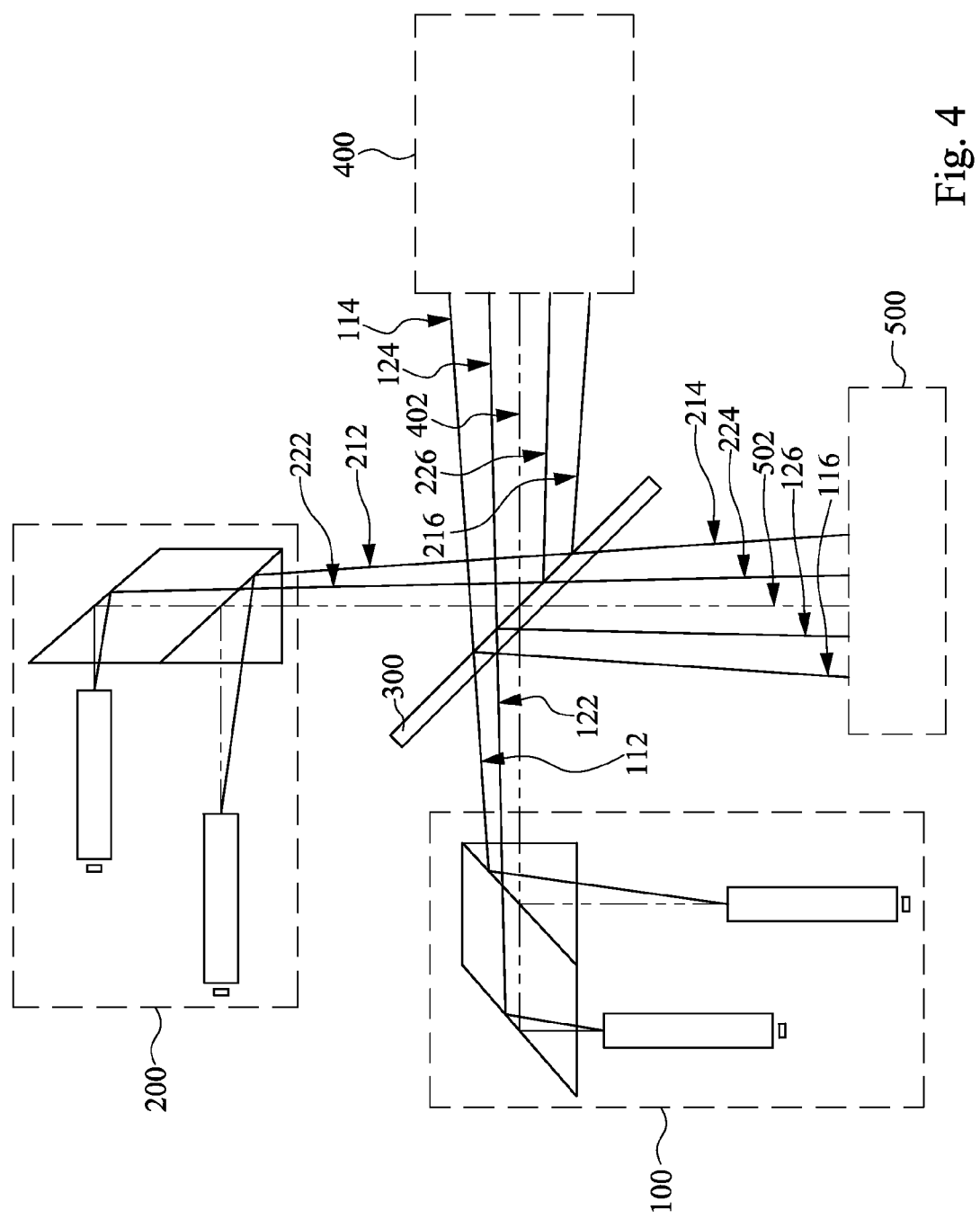
FIG. 4 is an optical diagram of the first light source module, the second light source module, and a dichroic mirror of FIG. 1.

FIG. 4 is an optical diagram of the first light source module 100, the second light source module 200, and the dichroic mirror 300 of FIG. 1. The dichroic mirror 300 transmits substantially 50% of the wavelengths of the first light beam 112, the second light beam 122, the third light beam 212, and the fourth light beam 222, and reflects substantially 50% of the wavelengths of the first light beam 112, the second light beam 122, the third light beam 212, and the fourth light beam 222. Therefore, each of the first light beam 112, the second light beam 122, the third light beam 212, and the fourth light beam 222 can be split into a first portion light beam and a second portion light beam whose intensities are substantially the same. In greater detail, when the first light beam 112 and the second light beam 122 are incident to the dichroic mirror 300 from one side of the dichroic mirror 300, about 50% of the first light beam 112 and the second light beam 122 can pass through the dichroic mirror 300 to the first optical path 402, and these portions of the light beams form first portions of the first light beam 114 and the second light beam 124. In addition, about 50% of the first light beam 112 and the second light beam 122 can be reflected by the dichroic mirror 300 to the second optical path 502, and these portions of the light beams form second portions of the first light beam 116 and the second light beam 126. Therefore, each of the first light beam 112 and the second light beam 122 can be split into two light beams after passing through the dichroic mirror 300. Similarly, when the third light beam 212 and the fourth light beam 222 are incident to the dichroic mirror 300 from another side of the dichroic mirror 300, about 50% of the third light beam 212 and the fourth light beam 222 can be reflected by the dichroic mirror 300 to the first optical path 402, and these portions of the light beams form first portions of the third light beam 216 and the fourth light beam 226. In addition, about 50% of the third light beam 212 and the fourth light beam 222 can pass through the dichroic mirror 300 to the second optical path 502, and these portions of the light beams form second portions of the third light beam 214 and the fourth light beam 224. Therefore, each of the third light beam 212 and the fourth light beam 222 can be split into two light beams after passing through the dichroic mirror 300. Through such a configuration, a doubling of the number of image light sources is realized in a finite space, and the size of the stereoscopic projection device can be reduced.

It should be understood that the first optical path 402 forms a kind of overall optical axis for the first portions of the first light beam 114, the second light beam 124, the third light beam 216, and the fourth light beam 226 after passing through the dichroic mirror 300. However, it is noted that the first light beam 114 and the second light beam 124 are disposed to one side of the optical axis, and the third light beam 216 and the fourth light beam 226 are disposed to another side of the optical axis. Moreover, the second optical path 502 forms a kind of overall optical axis for the second portions of the first light beam 116, the second light beam 126, the third light beam 214, and the fourth light beam 224 after passing through the dichroic mirror 300. However, it is noted that the first light beam 116 and the second light beam 126 are disposed to one side of the optical axis, and the third light beam 214 and the fourth light beam 224 are disposed to another side of the optical axis.

Reference is made back to FIG. 1. In one or more embodiments, a distance of the optical path of the first light beam 112 from the light tunnel 182 (see FIG. 2) to a first relay lens 440 (see FIG. 5) of the first optical module 400, a distance of the optical path of the second light beam 122 from the light tunnel 184 (see FIG. 2) to the first relay lens 440 (see FIG. 5) of the first optical module 400, a distance of the optical path of the third light beam 212 from the light tunnel 282 (see FIG. 3) to the first relay lens 440 (see FIG. 5) of the first optical module 400, and a distance of the optical path of the fourth light beam 222 from the light tunnel 284 (see FIG. 3) to the first relay lens 440 (see FIG. 5) of the first optical module 400 can be the same to obtain a better image quality. Similarly, a distance of the optical path of the first light beam 112 from the light tunnel 182 (see FIG. 2) to a third relay lens 540 (see FIG. 6) of the second optical module 500, a distance of the optical path of the second light beam 122 from the light tunnel 184 (see FIG. 2) to a third relay lens 540 (see FIG. 6) of the second optical module 500, a distance of the optical path of the third light beam 212 from the light tunnel 282 (see FIG. 3) to a third relay lens 540 (see FIG. 6) of the second optical module 500, and a distance of the optical path of the fourth light beam 222 from the light tunnel 284 (see FIG. 3) to a third relay lens 540 (see FIG. 6) of the second optical module 500 can be the same to obtain a better image quality. However, this should not limit the claimed scope of the present invention.

Therefore, the stereoscopic projection device can provide light beams that propagate at different angles in time sequence. This will be described in greater detail with reference to FIG. 2. In a certain time period, the first light source 110 is first turned on, while the other light sources are turned off at the same time. The first light beam 112 is incident to the first incident surface 152 after it passes through the light tunnel 182. The first light beam 112 is then reflected by the first gap 156 and reaches the first light emitting surface 154. Referring to FIG. 4, after the first light beam 112 reaches the dichroic mirror 300, about 50% of the first light beam 112 passes through the dichroic mirror 300 to the first optical path 402 and then enters the first optical module 400. This portion of the first light beam 112 is the first portion of the first light beam 114. In addition, about 50% of the first light beam 112 is reflected by the dichroic mirror 300, reaches the second optical path 502, and then enters the second optical module 500. This portion of the first light beam 112 is the second portion of the first light beam 116. After guiding and modulating by the first optical module 400 and the second optical module 500 respectively, the first light beams 114 and 116 can be formed as different image light beams and then emitted to the lens (details are described in the following paragraphs).

Reference is made back to FIG. 2. In the next time period, the second light source 120 is turned on, and at the same time, the first light source 110 is turned off. The second light beam 122 is incident to the second incident surface 162 after it passes through the light tunnel 184. The second light beam 122 is then reflected by the first reflective surface 164, passes through the first gap 156, and reaches the first light emitting surface 154. Reference is now made to FIG. 4. After the second light beam 122 reaches the dichroic mirror 300, about 50% of the second light beam 122 passes through the dichroic mirror 300 to the first optical path 402 and then enters the first optical module 400. This portion of the second light beam 122 is the first portion of the second light beam 124. In addition, about 50% of the second light beam 122 is reflected by the dichroic mirror 300, reaches the second optical path 502, and then enters the second optical module 500. This portion of the second light beam 122 is the second portion of the second light beam 126. After guiding and modulating by the first optical module 400 and the second optical module 500 respectively, the second light beams 124 and 126 can be formed as different image light beams and then emitted to the lens (details are described in the following paragraphs).

Reference is made back to FIG. 3. In the next time period, the third light source 210 is turned on, while at the same time, the second light source 120 (see FIG. 2) is turned off. The third light beam 212 is incident to the third incident surface 252 after it passes through the light tunnel 282. The third light beam 212 is then reflected by the second gap 256 and reaches the second light emitting surface 254. Reference is now made to FIG. 4. After the third light beam 212 reaches the dichroic mirror 300, about 50% of the third light beam 212 is reflected to the first optical path 402 by the dichroic mirror 300 and then enters the first optical module 400. This portion of the third light beam 212 is the first portion of the third light beam 216. In addition, about 50% of the third light beam 212 passes through the dichroic mirror 300 to the second optical path 502, and then enters the second optical module 500. This portion of the third light beam 212 is the second portion of the third light beam 214. After guiding and modulating by the first optical module 400 and the second optical module 500 respectively, the third light beams 214 and 216 can be formed as different image light beams and then emitted to the lens (details are described in the following paragraphs).

Reference is made back to FIG. 3. In the next time period, the fourth light source 220 is turned on, while at the same time, the third light source 210 is turned off. The fourth light beam 222 is incident to the fourth incident surface 262 after it passes through the light tunnel 284. The fourth light beam 222 then reflected by the second reflective surface 264, passes through the second gap 256, and reaches the second light emitting surface 254. Reference is now made to FIG. 4. After the fourth light beam 222 reaches the dichroic mirror 300, about 50% of the fourth light beam 222 is reflected to the first optical path 402 by the dichroic mirror 300 and then enters the first optical module 400. This portion of the fourth light beam 222 is the first portion of the fourth light beam 226. In addition, about 50% of the fourth light beam 222 passes through the dichroic mirror 300 to the second optical path 502, and then enters the second optical module 500. This portion of the fourth light beam 222 is the second portion of the fourth light beam 224. After guiding and modulating by the first optical module 400 and the second optical module 500 respectively, the fourth light beams 224 and 226 can be formed as different image light beams and then emitted to the lens (details are described in the following paragraphs). Therefore, the stereoscopic projection device can generate image light beams with different images and different view fields by repeating the process described above. However, the turn-on sequence of each light source mentioned above is only illustrative, and should not limit the scope of the claimed invention. An embodiment falls within the scope of the claimed invention if all the light sources are turned except one in any time period.

Figure 5:
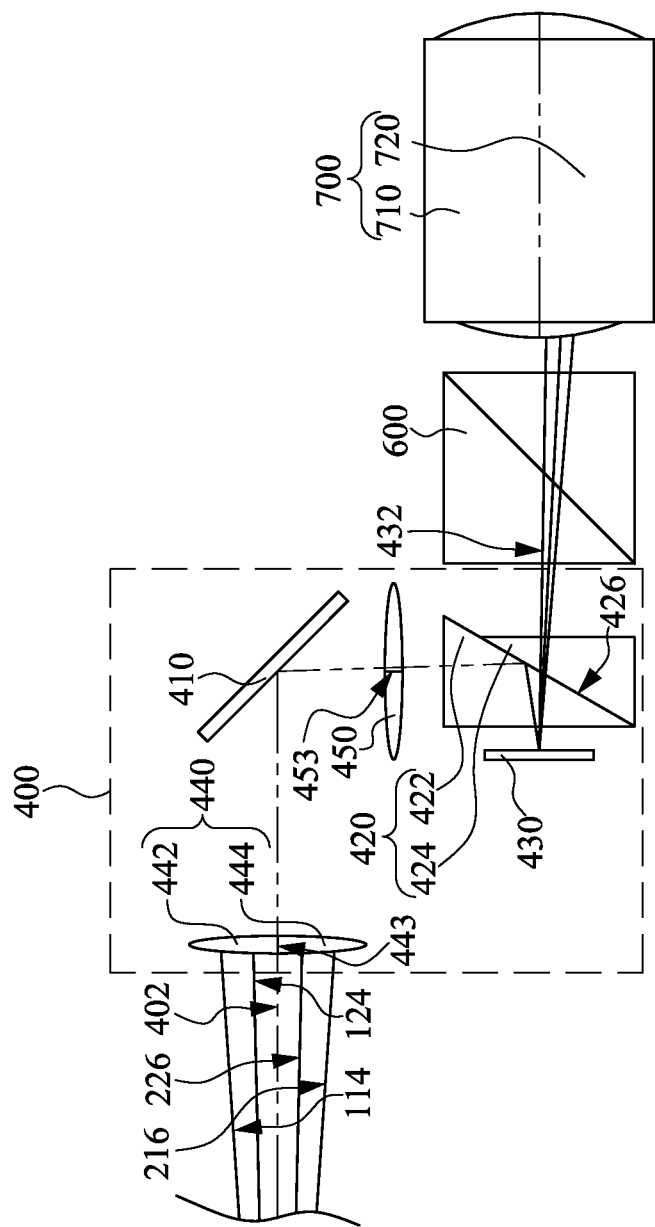
FIG. 5 is an optical diagram of a first optical module, a beam-combining prism, and a lens of FIG. 1.

FIG. 5 is an optical diagram of the first optical module 400, the beam-combining prism 600, and the lens 700 of FIG. 1. The first portions of the first light beam 114, the second light beam 124, the third light beam 216, and the fourth light beam 226 guided to the first optical path 402 enter the first optical module 400. It should be understood that the propagation paths of the light beams entering the first optical module 400 are represented by an optical axis, i.e., the first optical path 402, for clarity. However, these light beams actually propagate in a manner deviating from the optical axis at different angles. The first optical module 400 includes a first reflector 410, a first prism group 420, and a first image modulator 430. The first reflector 410 is used for reflecting the light beams propagating from the dichroic mirror 300 as shown in FIG. 4, for example, the first portions of the first light beam 114, the second light beam 124, the third light beam 216, and the fourth light beam 226 in the present embodiment, to the first prism group 420. The first image modulator 430 is used for modulating the light beams propagating from the first reflector 410, for example, the first portions of the first light beam 114, the second light beam 124, the third light beam 216, and the fourth light beam 226, to be the first image light beams 432. The first prism group 420 is used for guiding the light beams propagating from the first reflector 410 to the first image modulator 430, and guiding the first image light beams 432 to the beam-combining prism 600. The first prism group 420 includes prisms 422 and 424 which define a gap 426 therebetween. The gap 426 may be an air gap. In addition, the first optical module 400 further includes a first relay lens 440 and a second relay lens 450 both for assisting to guide the light beams propagating from the dichroic mirror 300 to the first image modulator 430. The first relay lens 440 is disposed between the dichroic mirror 300 and the first reflector 410, in which the first relay lens 440 has an optical axis 443 overlapping the first optical path 402. The first relay lens 440 includes a first half portion 442 and a second half portion 444, in which the first half portion 442 and the second half portion 444 are disposed on the opposite sides of the optical axis 443 of the first relay lens 440. The first portions of the first light beam 114 and the second light beam 124 pass through the first half portion 442 of the first relay lens 440, and the first portions of the third light beam 216 and the fourth light beam 226 pass through the second half portion 444 of the first relay lens 440. The second relay lens 450 is disposed between the first reflector 410 and the first prism group 420.

Therefore, the light beams propagating from the dichroic mirror 300 as shown in FIG. 4 (for example, the first portions of the first light beam 114, the second light beam 124, the third light beam 216, and the fourth light beam 226 in the present embodiment, whose propagation paths are represented by the first optical path 402) are first reflected to the gap 426 by the first reflector 410. The light beams are then reflected by the gap 426 and also guided by the first relay lens 440 and the second relay lens 450 to the first image modulator 430. The first image modulator 430 modulates the light beams to be the first image light beams 432 with different images, which then propagate back to the first prism group 420, pass through the gap 426, and leave the first optical module 400.

Figure 6:
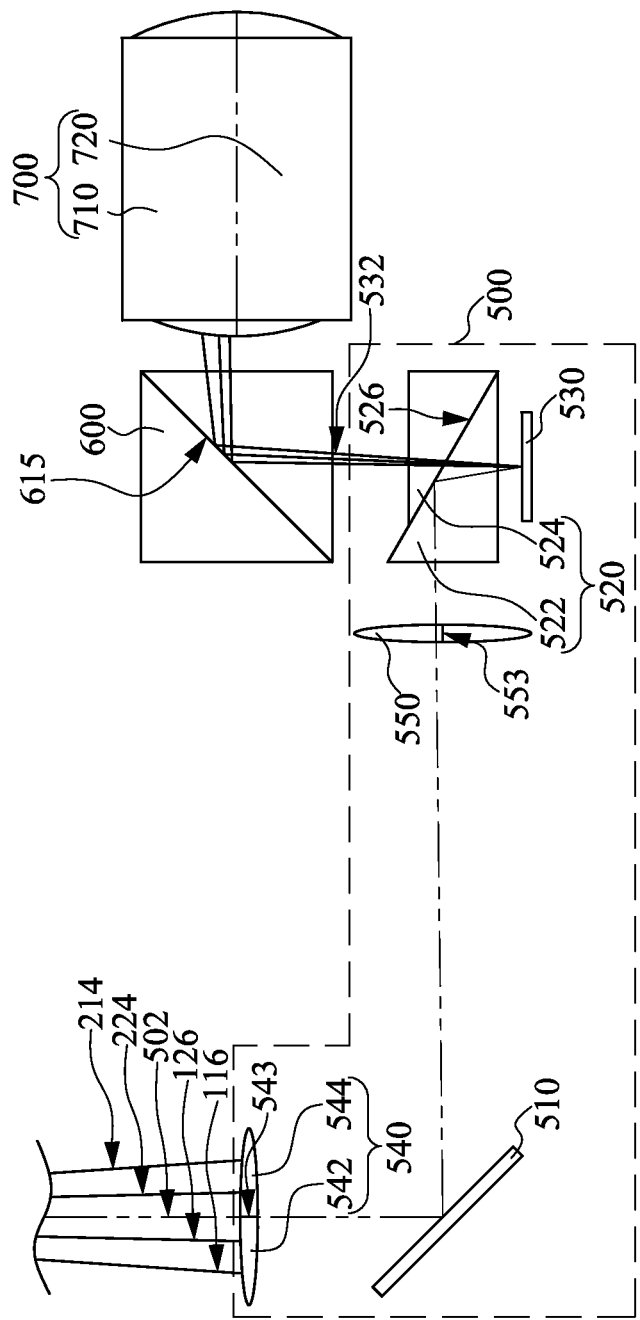
FIG. 6 is an optical diagram of a second optical module, the beam-combining prism, and the lens of FIG. 1.

FIG. 6 is an optical diagram of the second optical module 500, the beam-combining prism 600, and the lens 700 of FIG. 1. The second portions of the first light beam 116, the second light beam 126, the third light beam 214, and the fourth light beam 224 guided to the second optical path 502 enter the second optical module 500. It should be understood that the propagation paths of the light beams entering the second optical module 500 are represented by an optical axis, i.e., the second optical path 502, for clarity. However, these light beams actually propagate in a manner deviating from the optical axis at different angles.

The second optical module 500 includes a second reflector 510, a second prism group 520, and a second image modulator 530. The second reflector 510 is used for reflecting the light beams propagating from the dichroic mirror 300 as shown in FIG. 4, for example, the second portions of the first light beam 116, the second light beam 126, the third light beam 214, and the fourth light beam 224 in the present embodiment, to the second prism group 520. The second image modulator 530 is used for modulating the light beams propagating from the second reflector 510, for example, the second portions of the first light beam 116, the second light beam 126, the third light beam 214, and the fourth light beam 224, to be the second image light beams 532. The second prism group 520 is used for guiding the light beams propagating from the second reflector 510 to the second image modulator 530, and guiding the second image light beams 532 to the beam-combining prism 600. The second prism group 520 includes prisms 522 and 524, which define a gap 526 therebetween. The gap 526 may be an air gap. In addition, the second optical module 500 further includes a third relay lens 540 and a fourth relay lens 550 both for assisting to guide the light beams propagating from the dichroic mirror 300 to the second image modulator 530. The third relay lens 540 is disposed between the dichroic mirror 300 and the second reflector 510, in which the third relay lens 540 has an optical axis 543 overlapping the second optical path 502. The third relay lens 540 includes a third half portion 542 and a fourth half portion 544, in which the third half portion 542 and the fourth half portion 544 are disposed on the opposite sides of the optical axis 543 of the third relay lens 540. The second portions of the first light beam 116 and the second light beam 126 pass through the third half portion 542 of the third relay lens 540, and the second portions of the third light beam 214 and the fourth light beam 224 pass through the fourth half portion 544 of the third relay lens 540. The fourth relay lens 550 is disposed between the second reflector 510 and the second prism group 520.

Therefore, the light beams propagating from the dichroic mirror 300 as shown in FIG. 4 (for example, the second portions of the first light beam 116, the second light beam 126, the third light beam 214, and the fourth light beam 224 in the present embodiment, whose propagation paths are represented by the second optical path 502) are first reflected to the gap 526 by the second reflector 510. The light beams are then reflected by the gap 526 and also guided by the third relay lens 540 and the fourth relay lens 550 to the second image modulator 530. The second image modulator 530 modulates the light beams to be the second image light beams 532 with different images, which then propagate back to the second prism group 520, pass through the gap 526, and leave the second optical module 500.

Figure 7:
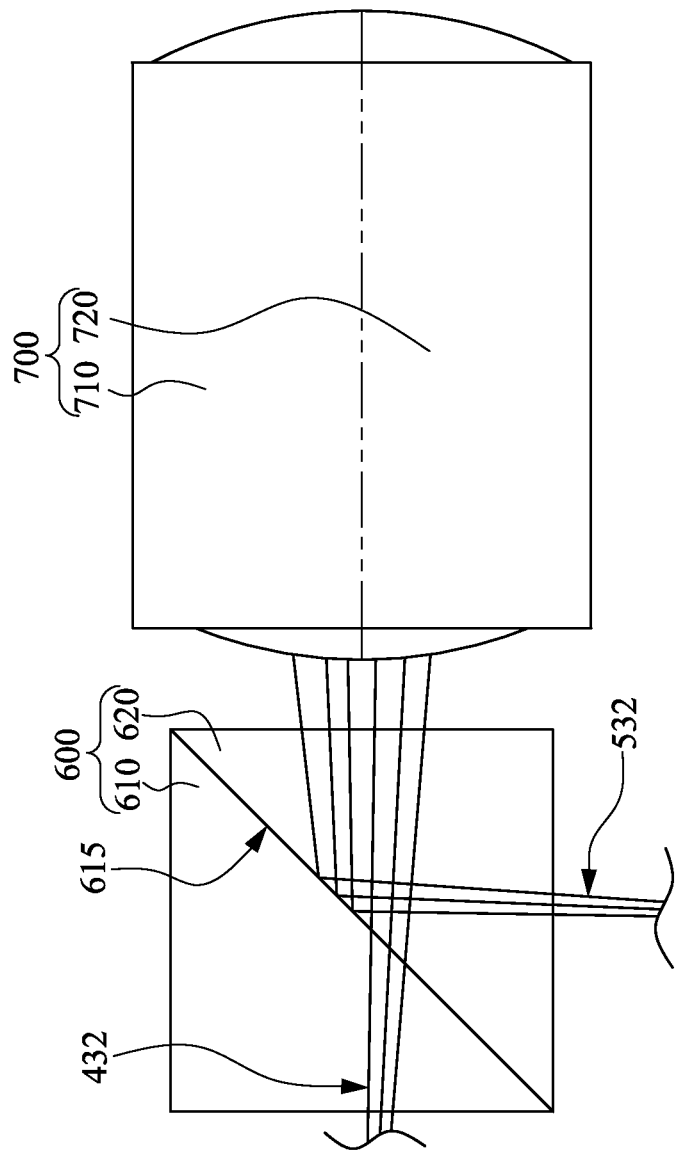
FIG. 7 is an optical diagram of the beam-combining prism and the lens of FIG. 1.

FIG. 7 is an optical diagram of the beam-combining prism 600 and the lens 700 of FIG. 1. The first image light beams 432 leaving from the first optical module 400 (see FIG. 5) and the second image light beams 532 leaving from the second optical module 500 (see FIG. 6) are respectively incident to two substantially orthogonal sides of the beam-combining prism 600. The beam-combining prism 600 includes prisms 610 and 620, which define a gap 615 therebetween. The gap 615 may be an air gap. The first image light beams 432 are incident to the gap 615 at a small angle, such that the first image light beams 432 pass through the gap 615 and are then incident to a second half portion 720 of the lens 700. On the other hand, the second image light beams 532 are incident to the gap 615 at a large angle, such that the second image light beams 532 are reflected by the gap 615 and are then incident to a first half portion 710 of the lens 700. Therefore, the first image light beams 432 and the second image light beams 532 all with different images can be incident to different positions of the lens 700.

Reference is made back to FIG. 5. Optionally, the first reflector 410 may be rotated (for example, clockwise in the present embodiment) by a small angle to guide the first image light beams 432 to the second half portion 720 of the lens 700. Therefore, the first optical path 402 after passing through the first reflector 410 does not overlap an optical axis 453 of the second relay lens 450. The first image modulator 430 may also be rotated a small angle to further guide the first image light beams 432 to the second half portion 720 of the lens 700.

Reference is made back to FIG. 6. Similarly and optionally, the second reflector 510 may be rotated (for example, counterclockwise in the present embodiment) by a small angle to guide the second image light beams 532 to the first half portion 710 of the lens 700. Therefore, the second optical path 502 after passing through the second reflector 510 does not overlap an optical axis 553 of the fourth relay lens 550. The second image modulator 530 may also be rotated a small angle to further guide the second image light beams 532 to the first half portion 710 of the lens 700.

It is noted that the structures of the first light source module and the second light source module are not limited to the structures mentioned above.

Figure 8:
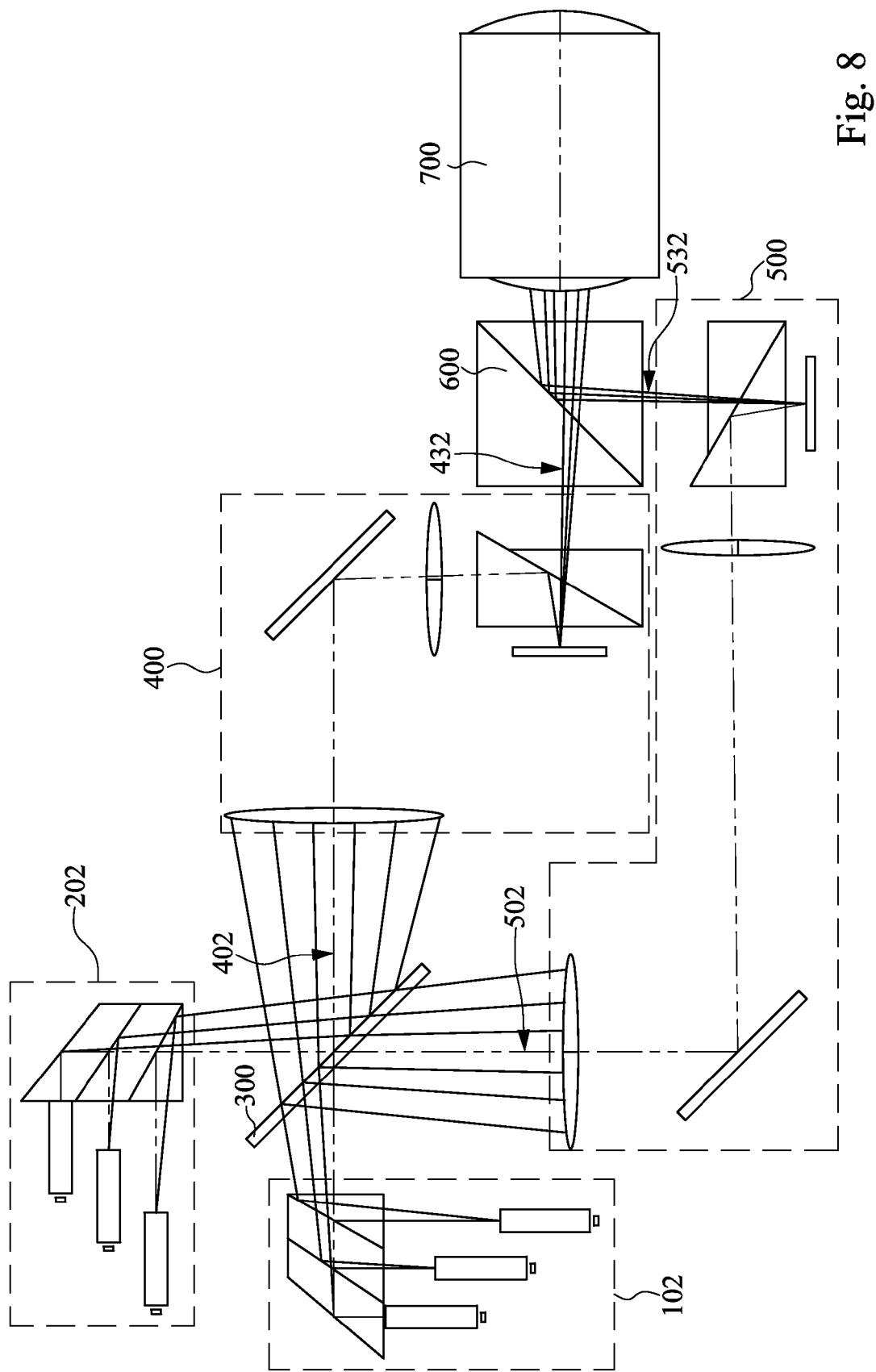
FIG. 8 is a schematic diagram of a stereoscopic projection device according to another embodiment of the present invention.

FIG. 8 is a schematic diagram of a stereoscopic projection device according to another embodiment of the present invention. The stereoscopic projection device includes a first light source module 102, a second light source module 202, a dichroic mirror 300, a first optical module 400, a second optical module 500, and a beam-combining prism 600. Each of the first light source module 102 and the second light source module 202 includes three light sources, which provide three light beams, respectively. The light beams of the first light source module 102 propagate at different angles after passing through the first light source module 102, and the light beams of the second light source module 202 propagate at different angles after passing through the second light source module 202. The first light source module 102 and the second light source module 202 are disposed at different sides of the dichroic mirror 300. The dichroic mirror 300 is used for splitting the light beams into first portions and second portions. The first portions of the light beams are guided to a first optical path 402 by the dichroic mirror 300, and the second portions of the light beams are guided to a second optical path 502 by the dichroic mirror 300. The light beams passing along the first optical path 402 are guided and modulated by the first optical module 400 to be first image light beams 432 with different images. The light beams passing along the second optical path 502 are guided and modulated by the second optical module 500 to be second image light beams 532 with different images. The beam-combining prism 600 is used for emitting the first image light beams 432 and the second image light beams 532 toward a lens 700, and the lens 700 then projects the first image light beams 432 and the second image light beams 532 to different view fields.

Figure 9:
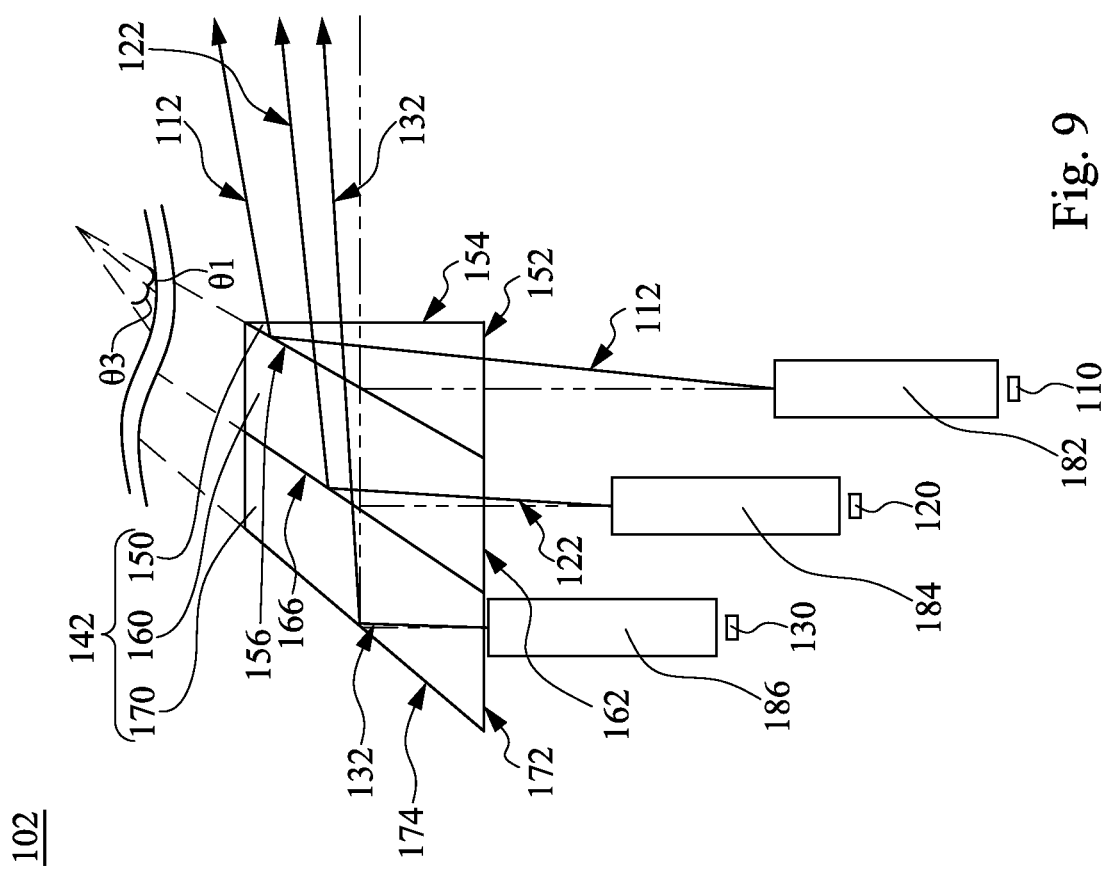
FIG. 9 is a schematic diagram of a first light source module of FIG. 8.

FIG. 9 is a schematic diagram of the first light source module 102 of FIG. 8. The first light source module 102 includes a first light source 110, a second light source 120, a fifth light source 130, and a first prism module 142. The first light source 110 is used for providing a first light beam 112, the second light source 120 is used for providing a second light beam 122, and the fifth light source 130 is used for providing a fifth light beam 132. The first prism module 142 is used for collecting the first light beam 112, the second light beam 122, and the fifth light beam 132. The first light beam 112, the second light beam 122, and the fifth light beam 132 emit at different angles after passing through the first prism module 142. The first light source 110, the second light source 120, and the fifth light source 130 may be solid-state light sources, such as light emitting diode light sources. However, this should not limit the claimed scope of the present invention.

In one or more embodiments, the first prism module 142 may include a first prism 150, a second prism 160, and a fifth prism 170. The first prism 150 has a first incident surface 152 and a first light emitting surface 154. The second prism 160 has a second incident surface 162. The first prism 150 and the second prism 160 define a first gap 156 therebetween. The fifth prism 170 has a fifth incident surface 172 and a first reflective surface 174. The second prism 160 and the fifth prism 170 define a third gap 166 therebetween. The first gap 156 and the third gap 166 may be air gaps. An interface between the air and the prism has a total internal reflection angle. A light beam can pass through the first gap 156 and/or the third gap 166 if the light beam is incident to the first gap 156 and/or the third gap 166 at an angle smaller than the total internal reflection angle, while the light beam can be reflected by the first gap 156 and/or the third gap 166 if the light beam is incident to the first gap 156 and/or the third gap 166 at an angle larger than the total internal reflection angle. Additionally, the first reflective surface 174 may have a total internal reflection angle. The fifth light beam 132 can be incident to the first reflective surface 174 at an angle larger than the total internal reflection angle of the first reflective surface 174, such that the fifth light beam 132 can be reflected by the first reflective surface 174.

The first light beam 112 is incident to the first prism module 142 from the first incident surface 152, and is incident to the first gap 156 at an angle larger than the total internal reflection angle of the interface of the first gap 156. The first light beam 112 is then reflected by the first gap 156 and reaches the first light emitting surface 154. The second light beam 122 is incident to the first prism module 142 from the second incident surface 162, and is incident to the third gap 166 at an angle larger than the total internal reflection angle of the interface of the third gap 166. The second light beam 122 is then reflected by the third gap 166 and incident to the first gap 156 at an angle smaller than the total internal reflection angle of the interface of the first gap 156. The second light beam 122 then passes through the first gap 156 and reaches the first light emitting surface 154. The fifth light beam 132 is incident to the first prism module 142 from the fifth incident surface 172, and then incident to the first reflective surface 174. The fifth light beam 132 is then reflected to the third gap 166 by the first reflective surface 174. Since the fifth light beam 132 is incident to the third gap 166 and the first gap 156 at an angle smaller than both the total internal reflection angles of the third gap 166 and the first gap 156, the fifth light beam 132 passes through the third gap 166 and the first gap 156 to the first light emitting surface 154. In summary, since an angle between the first light beam 112 and a normal line of the first gap 156, an angle between the second light beam 122 and the normal line of the first gap 156, and an angle between the fifth light beam 132 and the normal line of the first gap 156 are different, the first light beam 112, the second light beam 122, and the fifth light beam 132 can emerge from the first light emitting surface 154 at different angles, and then be modulated to form different images corresponding to different view fields.

An angle θ1 between the third gap 166 and the first gap 156 can be designed as an angle between 0 degrees and 20/3 degrees (20 degrees divided by the number (3) of light sources), such that the angle between the first light beam 112 and the normal line of the first gap 156 is larger than the total internal reflection angle of the interface of the first gap 156, and the angle between the second light beam 122 and the normal line of the first gap 156 is smaller than the total internal reflection angle of the interface of the first gap 156. Therefore, the first light beam 112 can be reflected by the first gap 156, and the second light beam 122 can be reflected by the third gap 166 and then pass through the first gap 156. In addition, an angle θ3 between the first reflective surface 174 and the third gap 166 can be designed as an angle between 0 degrees and 20/3 degrees (20 degrees divided by the number (3) of light sources), such that the angle between the second light beam 122 and the normal line of the third gap 166 is larger than the total internal reflection angle of the interface of the third gap 166, and the angle between the fifth light beam 132 and the normal line of the third gap 166 is smaller than the total internal reflection angle of the interface of the third gap 166. Therefore, the second light beam 122 can be reflected by the third gap 166, and the fifth light beam 132 can be reflected by the first reflective surface 174 and then pass through the third gap 166. However, this should not limit the claimed scope of the present invention. In one or more embodiments, the first light source module 102 may further include light tunnels 182, 184, and 186 for making uniform the first light beam 112 emitted from the first light source 110, the second light beam 122 emitted from the second light source 120, and the fifth light beam 132 emitted from the fifth light source 130, respectively, to improve the quality of the first, second, and fifth light beams 112, 122, 132. It is noted that for a first light source module having more than three light beams, an angle between the first reflective surface and the adjacent gap, and angles individually between the adjacent gaps are all between 0 degrees and 20/(the number of the light sources) degrees.

Figure 10:
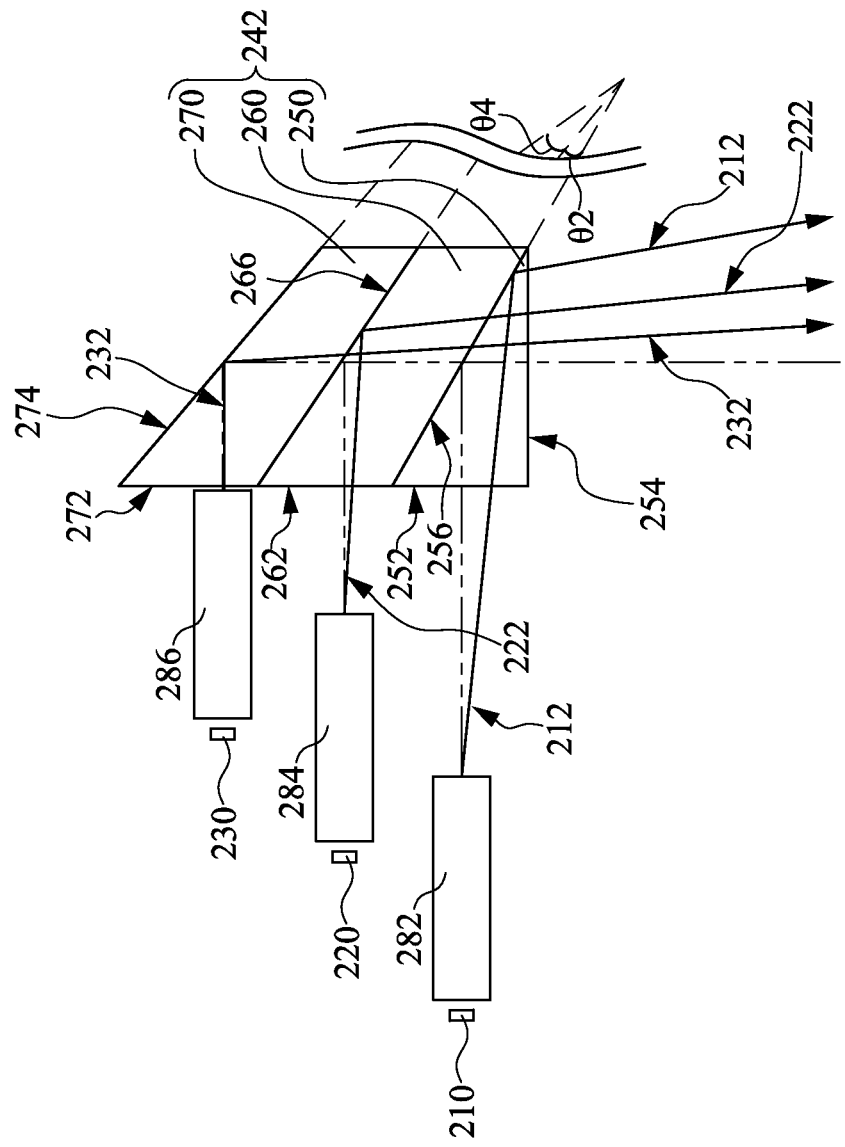
FIG. 10 is a schematic diagram of a second light source module of FIG. 8.

FIG. 10 is a schematic diagram of the second light source module 202 of FIG. 8. The second light source module 202 includes a third light source 210, a fourth light source 220, a sixth light source 230, and a second prism module 242. The third light source 210 is used for providing a third light beam 212, the fourth light source 220 is used for providing a fourth light beam 222, and the sixth light source 230 is used for providing a sixth light beam 232. The second prism module 242 is used for collecting the third light beam 212, the fourth light beam 222, and the sixth light beam 232. The third light beam 212, the fourth light beam 222, and the sixth light beam 232 emit at different angles after passing through the second prism module 242. The third light source 210, the fourth light source 220, and the sixth light source 230 may be solid-state light sources, such as light emitting diode light sources. However, this should not limit the claimed scope of the present invention.

In one or more embodiments, the second prism module 242 may include a third prism 250, a fourth prism 260, and a sixth prism 270. The third prism 250 has a third incident surface 252 and a second light emitting surface 254. The fourth prism 260 has a fourth incident surface 262. The third prism 250 and the fourth prism 260 define a second gap 256 therebetween. The sixth prism 270 has a sixth incident surface 272 and a second reflective surface 274. The fourth prism 260 and the sixth prism 270 define a fourth gap 266 therebetween. The second gap 256 and the fourth gap 266 may be air gaps. An interface between the air and the prism has a total internal reflection angle. A light beam can pass through the second gap 256 and/or the fourth gap 266 if the light beam is incident to the second gap 256 and/or the fourth gap 266 at an angle smaller than the total internal reflection angle, and the light beam can be reflected by the second gap 256 and/or the fourth gap 266 if the light beam is incident to the second gap 256 and/or the fourth gap 266 at an angle larger than the total internal reflection angle. Additionally, the second reflective surface 274 may have a total internal reflection angle. The sixth light beam 232 can be incident to the second reflective surface 274 at an angle larger than the total internal reflection angle of the second reflective surface 274, such that the sixth light beam 232 can be reflected by the second reflective surface 274.

The third light beam 212 is incident to the second prism module 242 from the third incident surface 252, and is incident to the second gap 256 at an angle larger than the total internal reflection angle of the interface of the second gap 256. The third light beam 212 is then reflected by the second gap 256 and reaches the second light emitting surface 254. The fourth light beam 222 is incident to the second prism module 242 from the fourth incident surface 262, and is incident to the fourth gap 266 at an angle larger than the total internal reflection angle of the interface of the fourth gap 266. The fourth light beam 222 is then reflected by the fourth gap 266 and incident to the second gap 256 at an angle smaller than the total internal reflection angle of the interface of the second gap 256. The fourth light beam 222 then passes through the second gap 256 and reaches the second light emitting surface 254. The sixth light beam 232 is incident to the second prism module 242 from the sixth incident surface 272, and then incident to the second reflective surface 274. The sixth light beam 232 is then reflected to the fourth gap 266 by the second reflective surface 274. Since the sixth light beam 232 is incident to the fourth gap 266 and the second gap 256 at an angle smaller than both the total internal reflection angles of the fourth gap 266 and the second gap 256, the sixth light beam 232 passes through the fourth gap 266 and the second gap 256 to the second light emitting surface 254. In summary, since an angle between the third light beam 212 and a normal line of the second gap 256, an angle between the fourth light beam 222 and the normal line of the second gap 256, and an angle between the sixth light beam 232 and the normal line of the second gap 256 are different, the third light beam 212, the fourth light beam 222, and the sixth light beam 232 can emerge from the second light emitting surface 254 at different angles, and then be modulated to form different images corresponding to different view fields.

An angle θ2 between the fourth gap 266 and the second gap 256 can be designed as an angle between 0 degrees and 20/3 degrees (20 degrees divided by the number of light sources), such that the angle between the third light beam 212 and the normal line of the second gap 256 is larger than the total internal reflection angle of the interface of the second gap 256, and the angle between the fourth light beam 222 and the normal line of the second gap 256 is smaller than the total internal reflection angle of the interface of the second gap 256. Therefore, the third light beam 212 can be reflected by the second gap 256, and the fourth light beam 222 can be reflected by the fourth gap 266 and then pass through the second gap 256. In addition, an angle θ4 between the second reflective surface 274 and the fourth gap 266 can be designed as an angle between 0 degrees and 20/3 degrees (20 degrees divided by the number of light sources), such that the angle between the fourth light beam 222 and the normal line of the fourth gap 266 is larger than the total internal reflection angle of the interface of the fourth gap 266, and the angle between the sixth light beam 232 and the normal line of the fourth gap 266 is smaller than the total internal reflection angle of the interface of the fourth gap 266. Therefore, the fourth light beam 222 can be reflected by the fourth gap 266, and the sixth light beam 232 can be reflected by the second reflective surface 274 and then pass through the fourth gap 266. However, this should not limit the claimed scope of the present invention. In one or more embodiments, the second light source module 202 may further include light tunnels 282, 284, and 286 for making uniform the third light beam 212 emitted from the third light source 210, the fourth light beam 222 emitted from the fourth light source 220, and the sixth light beam 232 emitted from the sixth light source 230, respectively, to improve the quality of the third, fourth, and sixth light beams 212, 222, 232. It is noted that for a second light source module having more than three light beams, an angle between the second reflective surface and the adjacent gap, and angles individually between the adjacent gaps are all between 0 degrees and 20/(the number of the light sources) degrees.

Figure 11:
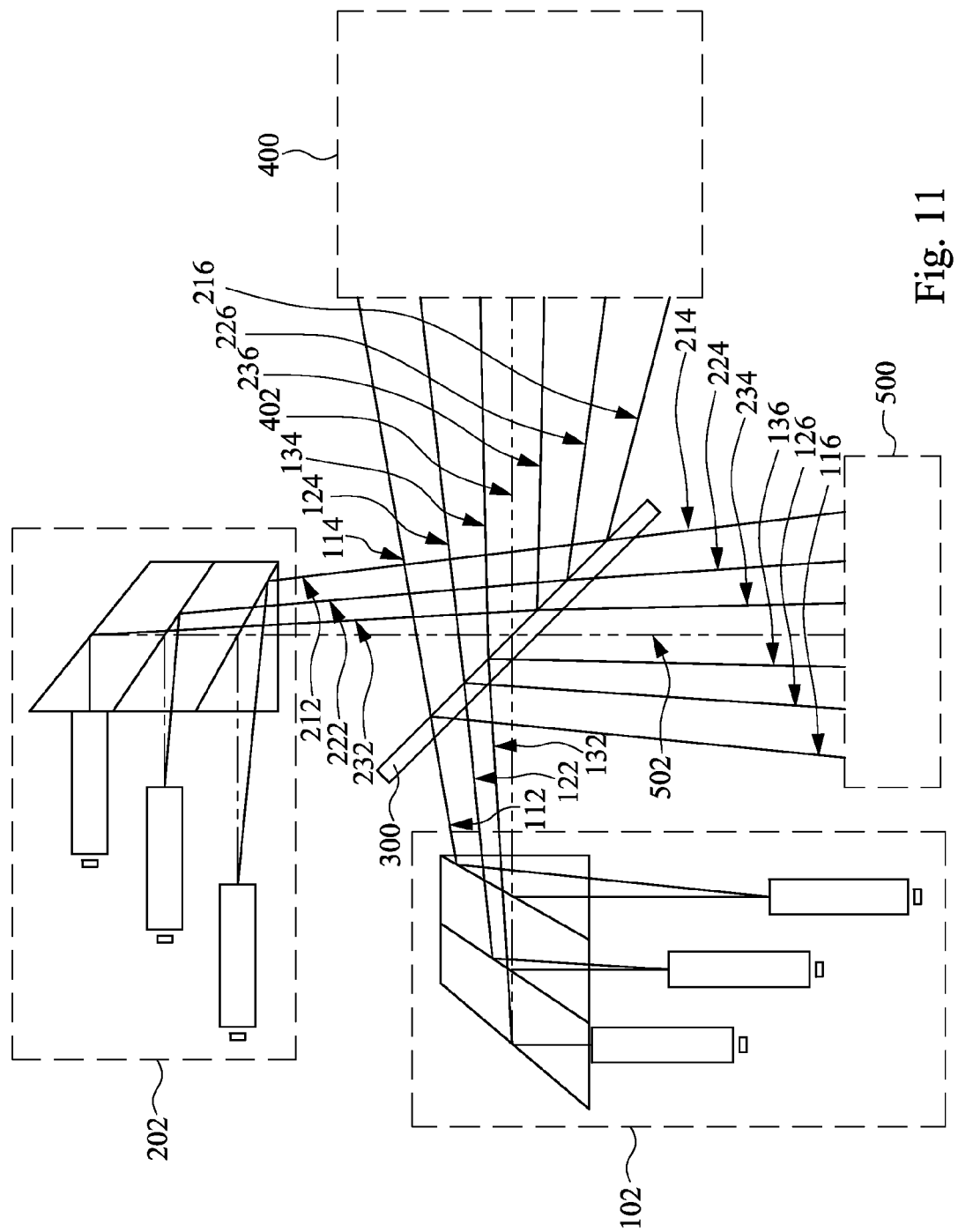
FIG. 11 is an optical diagram of the first light source module, the second light source module, and a dichroic mirror of FIG. 8.

FIG. 11 is an optical diagram of the first light source module 102, the second light source module 202, and the dichroic mirror 300 of FIG. 8. The dichroic mirror 300 transmits substantially 50% of the wavelengths of the first light beam 112, the second light beam 122, the third light beam 212, the fourth light beam 222, the fifth light beam 132, and the sixth light beam 232, and reflects substantially 50% of the wavelengths of the first light beam 112, the second light beam 122, the third light beam 212, the fourth light beam 222, the fifth light beam 132, and the sixth light beam 232. Therefore, each of the first light beam 112, the second light beam 122, the third light beam 212, the fourth light beam 222, the fifth light beam 132, and the sixth light beam 232 can be split into a first portion light beam and a second portion light beam whose intensities are substantially the same.

In greater detail, when the first light beam 112, the second light beam 122, and the fifth light beam 132 are incident to the dichroic mirror 300 from one side of the dichroic mirror 300, about 50% of the first light beam 112, the second light beam 122, and the fifth light beam 132 can pass through the dichroic mirror 300 to the first optical path 402, and these portions of the light beams form first portions of the first light beam 114, the second light beam 124, and the fifth light beam 134. In addition, about 50% of the first light beam 112, the second light beam 122, and the fifth light beam 132 can be reflected by the dichroic mirror 300 to the second optical path 502, and these portions of the light beams form second portions of the first light beam 116, the second light beam 126, and the fifth light beam 136. Therefore, each of the first light beam 112, the second light beam 122, and the fifth light beam 132 can be split into two light beams after passing through the dichroic mirror 300. Similarly, when the third light beam 212, the fourth light beam 222, and the sixth light beam 232 are incident to the dichroic mirror 300 from another side of the dichroic mirror 300, about 50% of the third light beam 212, the fourth light beam 222, and the sixth light beam 232 can be reflected by the dichroic mirror 300 to the first optical path 402, and these portions of the light beams form first portions of the third light beam 216, the fourth light beam 226, and the sixth light beam 236. In addition, about 50% of the third light beam 212, the fourth light beam 222, and the sixth light beam 232 can pass through the dichroic mirror 300 to the second optical path 502, and these portions of the light beams form second portions of the third light beam 214, the fourth light beam 224, and the sixth light beam 236. Therefore, each of the third light beam 212, the fourth light beam 222, and the sixth light beam 232 can be split into two light beams after passing through the dichroic mirror 300. Through such a configuration, a doubling of the number of image light sources is realized in a finite space, and the size of the stereoscopic projection device can be reduced.

It should be understood that the first optical path 402 forms a kind of overall optical axis for the first portions of the first light beam 114, the second light beam 124, the third light beam 216, the fourth light beam 226, the fifth light beam 134, and the sixth light beam 236 after passing through the dichroic mirror 300. However, it is noted that the first light beam 114, the second light beam 124, and the fifth light beam 134 are disposed to one side of the optical axis, and the third light beam 216, the fourth light beam 226, and the sixth light beam 236 are disposed to another side of the optical axis. Moreover, the second optical path 502 forms a kind of overall optical axis for the second portions of the first light beam 116, the second light beam 126, the third light beam 214, the fourth light beam 224, the fifth light beam 136, and the sixth light beam 236 after passing through the dichroic mirror 300. However, it is noted that the first light beam 116, the second light beam 126, and the fifth light beam 136 are disposed to one side of the optical axis, and the third light beam 214, the fourth light beam 224, and the sixth light beam 234 are disposed to another side of the optical axis.

Reference is made back to FIG. 8. In one or more embodiments, a distance of the optical path of the first light beam 112 from the light tunnel 182 (see FIG. 9) to a first relay lens 440 (see FIG. 12) of the first optical module 400, a distance of the optical path of the second light beam 122 from the light tunnel 184 (see FIG. 9) to the first relay lens 440 (see FIG. 12) of the first optical module 400, a distance of the optical path of the third light beam 212 from the light tunnel 282 (see FIG. 10) to the first relay lens 440 (see FIG. 12) of the first optical module 400, a distance of the optical path of the fourth light beam 222 from the light tunnel 284 (see FIG. 10) to the first relay lens 440 (see FIG. 12) of the first optical module 400, a distance of the optical path of the fifth light beam 132 from the light tunnel 186 (see FIG. 9) to the first relay lens 440 (see FIG. 12) of the first optical module 400, and a distance of the optical path of the sixth light beam 232 from the light tunnel 286 (see FIG. 10) to the first relay lens 440 (see FIG. 12) of the first optical module 400 can be the same to obtain a better image quality. Similarly, a distance of the optical path of the first light beam 112 from the light tunnel 182 (see FIG. 9) to a third relay lens 540 (see FIG. 13) of the second optical module 500, a distance of the optical path of the second light beam 122 from the light tunnel 184 (see FIG. 9) to a third relay lens 540 (see FIG. 13) of the second optical module 500, a distance of the optical path of the third light beam 212 from the light tunnel 282 (see FIG. 10) to a third relay lens 540 (see FIG. 13) of the second optical module 500, a distance of the optical path of the fourth light beam 222 from the light tunnel 284 (see FIG. 10) to a third relay lens 540 (see FIG. 13) of the second optical module 500, a distance of the optical path of the fifth light beam 132 from the light tunnel 186 (see FIG. 9) to a third relay lens 540 (see FIG. 13) of the second optical module 500, and a distance of the optical path of the sixth light beam 232 from the light tunnel 286 (see FIG. 10) to a third relay lens 540 (see FIG. 13) of the second optical module 500 can be the same to obtain a better image quality. However, this should not limit the claimed scope of the present invention.

Therefore, the stereoscopic projection device can provide light beams that propagate at different angles in time sequence. This will be described in greater detail with reference to FIG. 9. In a certain time period, the first light source 110 is first turned on, while the other light sources are turned off at the same time. The first light beam 112 is incident to the first incident surface 152 after it passes through the light tunnel 182. The first light beam 112 is then reflected by the first gap 156 and reaches the first light emitting surface 154. Referring to FIG. 11, after the first light beam 112 reaches the dichroic mirror 300, about 50% of the first light beam 112 passes through the dichroic mirror 300 to the first optical path 402 and then enters the first optical module 400. This portion of the first light beam 112 is the first portion of the first light beam 114. In addition, about 50% of the first light beam 112 is reflected by the dichroic mirror 300, reaches the second optical path 502, and then enters the second optical module 500. This portion of the first light beam 112 is the second portion of the first light beam 116. After guiding and modulating by the first optical module 400 and the second optical module 500 respectively, the first light beams 114 and 116 can be formed as different image light beams and then emitted to the lens (details are described in the following paragraphs).

Reference is made back to FIG. 9. In the next time period, the second light source 120 is turned on, and at the same time, the first light source 110 is turned off. The second light beam 122 is incident to the second incident surface 162 after it passes through the light tunnel 184. The second light beam 122 is then reflected by the third gap 166, passes through the first gap 156, and reaches the first light emitting surface 154. Reference is now made to FIG. 11. After the second light beam 122 reaches the dichroic mirror 300, about 50% of the second light beam 122 passes through the dichroic mirror 300 to the first optical path 402 and then enters the first optical module 400. This portion of the second light beam 122 is the first portion of the second light beam 124. In addition, about 50% of the second light beam 122 is reflected by the dichroic mirror 300, reaches the second optical path 502, and then enters the second optical module 500. This portion of the second light beam 122 is the second portion of the second light beam 126. After guiding and modulating by the first optical module 400 and the second optical module 500 respectively, the second light beams 124 and 126 can be formed as different image light beams and then emitted to the lens (details are described in the following paragraphs).

Reference is made back to FIG. 9. In the next time period, the fifth light source 130 is turned on, while at the same time, the second light source 120 is turned off. The fifth light beam 132 is incident to the fifth incident surface 172 after it passes through the light tunnel 186. The fifth light beam 132 is then reflected by the first reflective surface 174, passes through the third gap 166 and the first gap 156, and reaches the first light emitting surface 154. Reference is now made to FIG. 11. After the fifth light beam 132 reaches the dichroic mirror 300, about 50% of the fifth light beam 132 passes through the dichroic mirror 300 to the first optical path 402 and then enters the first optical module 400. This portion of the fifth light beam 132 is the first portion of the fifth light beam 134. In addition, about 50% of the fifth light beam 132 is reflected by the dichroic mirror 300, reaches the second optical path 502, and then enters the second optical module 500. This portion of the fifth light beam 132 is the second portion of the fifth light beam 136. After guiding and modulating by the first optical module 400 and the second optical module 500 respectively, the fifth light beams 134 and 136 can be formed as different image light beams and then emitted to the lens (details are described in the following paragraphs).

Reference is made back to FIG. 10. In the next time period, the third light source 210 is turned on, while at the same time, the fifth light source 130 (see FIG. 9) is turned. The third light beam 212 is incident to the third incident surface 252 after it passes through the light tunnel 282. The third light beam 212 is then reflected by the second gap 256 and reaches the second light emitting surface 254. Reference is now made to FIG. 11. After the third light beam 212 reaches the dichroic mirror 300, about 50% of the third light beam 212 is reflected to the first optical path 402 by the dichroic mirror 300 and then enters the first optical module 400. This portion of the third light beam 212 is the first portion of the third light beam 216. In addition, about 50% of the third light beam 212 passes through the dichroic mirror 300 to the second optical path 502, and then enters the second optical module 500. This portion of the third light beam 212 is the second portion of the third light beam 214. After guiding and modulating by the first optical module 400 and the second optical module 500 respectively, the third light beams 214 and 216 can be formed as different image light beams and then emitted to the lens (details are described in the following paragraphs).

Reference is made back to FIG. 10. In the next time period, the fourth light source 220 is turned on, while at the same time, the third light source 210 is turned off. The fourth light beam 222 is incident to the fourth incident surface 262 after it passes through the light tunnel 284. The fourth light beam 222 is then reflected by the fourth gap 266, passes through the second gap 256, and reaches the second light emitting surface 254. Reference is now made to FIG. 11. After the fourth light beam 222 reaches the dichroic mirror 300, about 50% of the fourth light beam 222 is reflected to the first optical path 402 by the dichroic mirror 300 and then enters the first optical module 400. This portion of the fourth light beam 222 is the first portion of the fourth light beam 226. In addition, about 50% of the fourth light beam 222 passes through the dichroic mirror 300 to the second optical path 502, and then enters the second optical module 500. This portion of the fourth light beam 222 is the second portion of the fourth light beam 224. After guiding and modulating by the first optical module 400 and the second optical module 500 respectively, the fourth light beams 224 and 226 can be formed as different image light beams and then emitted to the lens (details are described in the following paragraphs).

Reference is made back to FIG. 10. In the next time period, the sixth light source 230 is turned on, while at the same time, the fourth light source 220 is turned off. The sixth light beam 232 is incident to the sixth incident surface 272 after it passes through the light tunnel 286. The sixth light beam 232 is then reflected by the second reflective surface 274, passes through the fourth gap 266 and the second gap 256, and reaches the second light emitting surface 254. Reference is now made to FIG. 11. After the sixth light beam 232 reaches the dichroic mirror 300, about 50% of the sixth light beam 232 is reflected to the first optical path 402 by the dichroic mirror 300 and then enters the first optical module 400. This portion of the sixth light beam 232 is the first portion of the sixth light beam 236. In addition, about 50% of the sixth light beam 232 passes through the dichroic mirror 300 to the second optical path 502, and then enters the second optical module 500. This portion of the sixth light beam 232 is the second portion of the sixth light beam 234. After guiding and modulating by the first optical module 400 and the second optical module 500 respectively, the sixth light beams 234 and 236 can be formed as different image light beams and then emitted to the lens (details are described in the following paragraphs). Therefore, the stereoscopic projection device can generate image light beams with different images and different view fields by repeating the process described above. However, the turn-on sequence of each light source mentioned above is only illustrative, and should not limit the scope of the claimed invention. An embodiment falls within the scope of the claimed invention if all the light sources are all turned off except one in any time period.

Figure 12:
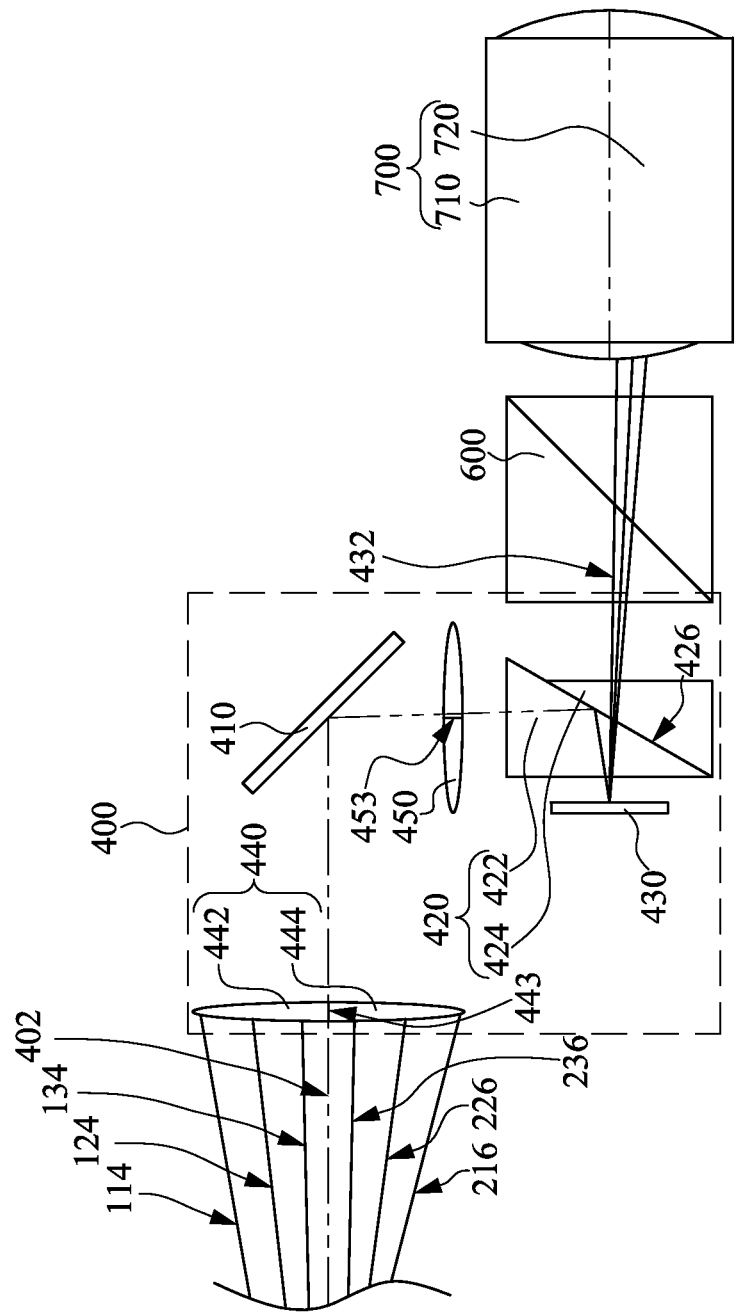
FIG. 12 is an optical diagram of a first optical module, a beam-combining prism, and a lens of FIG. 8.

FIG. 12 is an optical diagram of the first optical module 400, the beam-combining prism 600, and the lens 700 of FIG. 8. The first portions of the first light beam 114, the second light beam 124, the third light beam 216, the fourth light beam 226, the fifth light beam 134, and the sixth light beam 236 guided to the first optical path 402 enter the first optical module 400. It should be understood that the propagation paths of the light beams entering the first optical module 400 are represented by an optical axis, i.e., the first optical path 402, for clarity. However, these light beams actually propagate in a manner deviating from the optical axis at different angles.

The first optical module 400 includes a first reflector 410, a first prism group 420, and a first image modulator 430. The first reflector 410 is used for reflecting the light beams propagating from the dichroic mirror 300 as shown in FIG. 11, for example, the first portions of the first light beam 114, the second light beam 124, the third light beam 216, the fourth light beam 226, the fifth light beam 134, and the sixth light beam 236 in the present embodiment, to the first prism group 420. The first image modulator 430 is used for modulating the light beams propagating from the first reflector 410, for example, the first portions of the first light beam 114, the second light beam 124, the third light beam 216, the fourth light beam 226, the fifth light beam 134, and the sixth light beam 236, to be the first image light beams 432. The first prism group 420 is used for guiding the light beams propagating from the first reflector 410 to the first image modulator 430, and guiding the first image light beams 432 to the beam-combining prism 600. The first prism group 420 includes prisms 422 and 424 which define a gap 426 therebetween. The gap 426 may be an air gap. In addition, the first optical module 400 further includes a first relay lens 440 and a second relay lens 450 both for assisting to guide the light beams propagating from the dichroic mirror 300 to the first image modulator 430. The first relay lens 440 is disposed between the dichroic mirror 300 and the first reflector 410, in which the first relay lens 440 has an optical axis 443 overlapping the first optical path 402. The first relay lens 440 includes a first half portion 442 and a second half portion 444, in which the first half portion 442 and the second half portion 444 are disposed on the opposite sides of the optical axis 443 of the first relay lens 440. The first portions of the first light beam 114, the second light beam 124, and the fifth light beam 134 pass through the first half portion 442 of the first relay lens 440, and the first portions of the third light beam 216, the fourth light beam 226, and the sixth light beam 236 pass through the second half portion 444 of the first relay lens 440. The second relay lens 450 is disposed between the first reflector 410 and the first prism group 420.

Therefore, the light beams propagating from the dichroic mirror 300 as shown in FIG. 11 (for example, first portions of the first light beam 114, the second light beam 124, the third light beam 216, the fourth light beam 226, the fifth light beam 134, and the sixth light beam 236 in the present embodiment, whose propagation paths are represented by the first optical path 402) are first reflected to the gap 426 by the first reflector 410. The light beams are then reflected by the gap 426 and also guided by the first relay lens 440 and the second relay lens 450 to the first image modulator 430. The first image modulator 430 modulates the light beams to be the first image light beams 432 with different images, which then propagate back to the first prism group 420, pass through the gap 426, and leave the first optical module 400.

Figure 13:
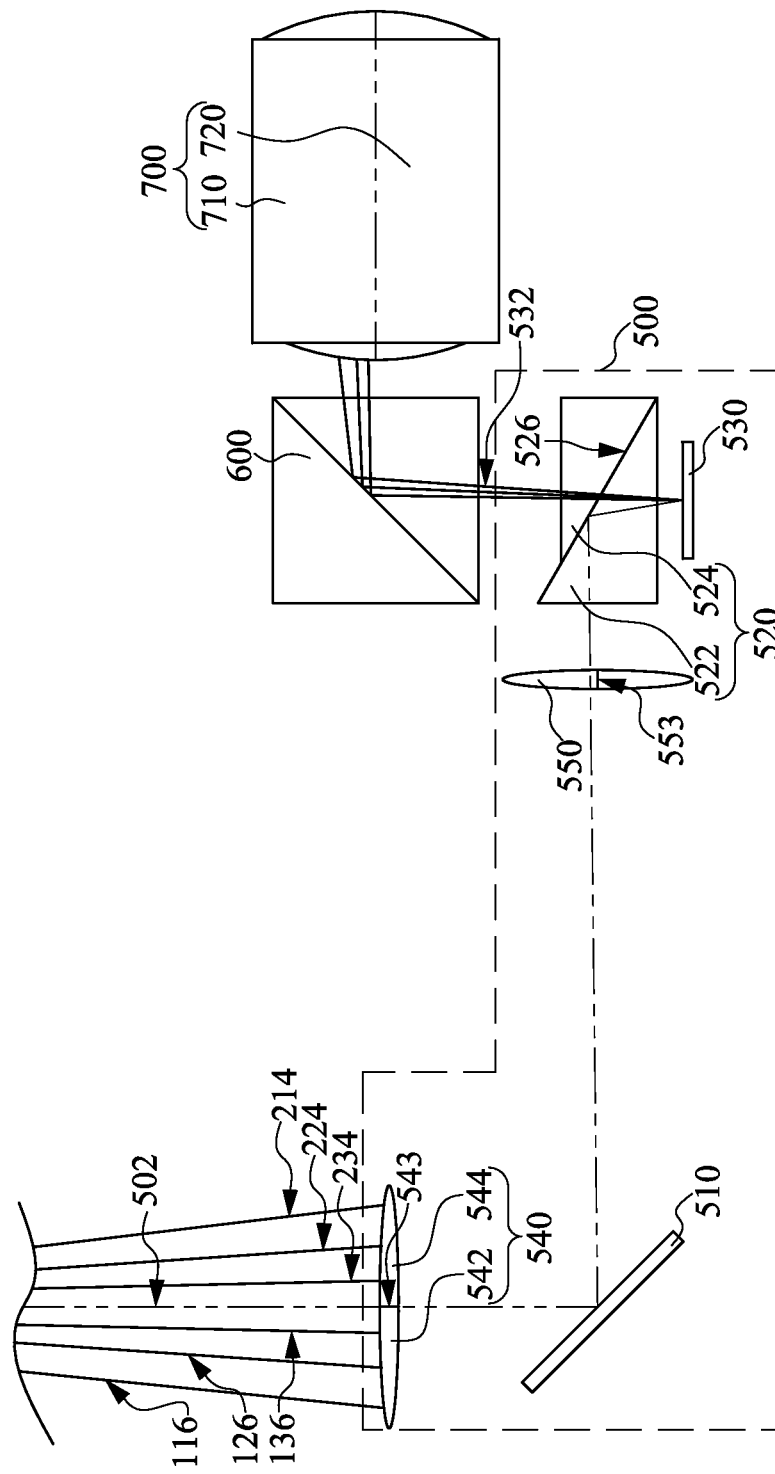
FIG. 13 is an optical diagram of a second optical module, the beam-combining prism, and the lens of FIG. 8.

FIG. 13 is an optical diagram of the second optical module 500, the beam-combining prism 600, and the lens 700 of FIG. 8. The second portions of the first light beam 116, the second light beam 126, the third light beam 214, the fourth light beam 224, the fifth light beam 136, and the sixth light beam 234 guided to the second optical path 502 enter the second optical module 500. It should be understood that the propagation paths of the light beams entering the second optical module 500 are represented by an optical axis, i.e., the second optical path 502, for clarity. However, these light beams actually propagate in a manner deviating from the optical axis at different angles.

The second optical module 500 includes a second reflector 510, a second prism group 520, and a second image modulator 530. The second reflector 510 is used for reflecting the light beams propagating from the dichroic mirror 300 as shown in FIG. 11, for example, the second portions of the first light beam 116, the second light beam 126, the third light beam 214, the fourth light beam 224, the fifth light beam 136, and the sixth light beam 234 in the present embodiment, to the second prism group 520. The second image modulator 530 is used for modulating the light beams propagating from the second reflector 510, for example, the second portions of the first light beam 116, the second light beam 126, the third light beam 214, the fourth light beam 224, the fifth light beam 136, and the sixth light beam 234, to be the second image light beams 532. The second prism group 520 is used for guiding the light beams propagating from the second reflector 510 to the second image modulator 530, and guiding the second image light beams 532 to the beam-combining prism 600. The second prism group 520 includes prisms 522 and 524, which define a gap 526 therebetween. The gap 526 may be an air gap. In addition, the second optical module 500 further includes a third relay lens 540 and a fourth relay lens 550 both for assisting to guide the light beams propagating from the dichroic mirror 300 to the second image modulator 530. The third relay lens 540 is disposed between the dichroic mirror 300 and the second reflector 510, in which the third relay lens 540 has an optical axis 543 overlapping the second optical path 502. The third relay lens 540 includes a third half portion 542 and a fourth half portion 544, in which the third half portion 542 and the fourth half portion 544 are disposed on the opposite sides of the optical axis 543 of the third relay lens 540. The second portions of the first light beam 116, the second light beam 126, and the fifth light beam 136 pass through the third half portion 542 of the third relay lens 540, and the second portions of the third light beam 214, the fourth light beam 224, and the sixth light beam 234 pass through the fourth half portion 544 of the third relay lens 540. The fourth relay lens 550 is disposed between the second reflector 510 and the second prism group 520.

Therefore, the light beams propagating from the dichroic mirror 300 as shown in FIG. 11 (for example, the second portions of the first light beam 116, the second light beam 126, the third light beam 214, the fourth light beam 224, the fifth light beam 136, and the sixth light beam 234 in the present embodiment, whose propagation paths are represented by the second optical path 502) are first reflected to the gap 526 by the second reflector 510. The light beams are then reflected by the gap 526 and also guided by the third relay lens 540 and the fourth relay lens 550 to the second image modulator 530. The second image modulator 530 modulates the light beams to be the second image light beams 532 with different images, which then propagate back to the second prism group 520, pass through the gap 526, and leave the second optical module 500.

Figure 14:
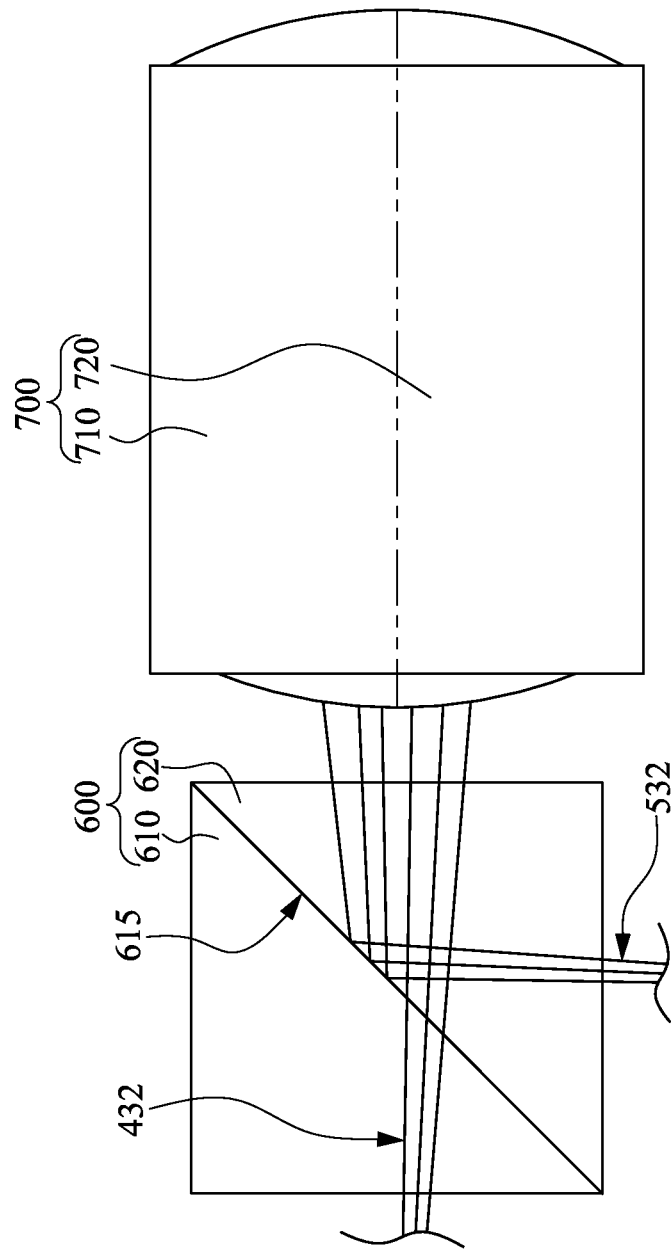
FIG. 14 is an optical diagram of the beam-combining prism and the lens of FIG. 8.

FIG. 14 is an optical diagram of the beam-combining prism 600 and the lens 700 of FIG. 8. The first image light beams 432 leaving from the first optical module 400 (see FIG. 12) and the second image light beams 532 leaving from the second optical module 500 (see FIG. 13) are respectively incident to two substantially orthogonal sides of the beam-combining prism 600. The beam-combining prism 600 includes prisms 610 and 620, which define a gap 615 therebetween. The gap 615 may be an air gap. The first image light beams 432 are incident to the gap 615 at a small angle, such that the first image light beams 432 pass through the gap 615 and are then incident to a second half portion 720 of the lens 700. On the other hand, the second image light beams 532 are incident to the gap 615 at a large angle, such that the second image light beams 532 are reflected by the gap 615 and are then incident to a first half portion 710 of the lens 700. Therefore, the first image light beams 432 and the second image light beams 532 all with different images can be incident to different positions of the lens 700.

Reference is made back to FIG. 12. Optionally, the first reflector 410 may be rotated (for example, clockwise in the present embodiment) by a small angle to guide the first image light beams 432 to the second half portion 720 of the lens 700. Therefore, the first optical path 402 after passing through the first reflector 410 does not overlap an optical axis 453 of the second relay lens 450. The first image modulator 430 may also be rotated a small angle to further guide the first image light beams 432 to the second half portion 720 of the lens 700.

Reference is made back to FIG. 13. Similarly and optionally, the second reflector 510 may be rotated (for example, counterclockwise in the present embodiment) by a small angle to guide the second image light beams 532 to the first half portion 710 of the lens 700. Therefore, the second optical path 502 after passing through the second reflector 510 does not overlap an optical axis 553 of the fourth relay lens 550. The second image modulator 530 may also be rotated a small angle to further guide the second image light beams 532 to the first half portion 710 of the lens 700.

It should be understood that although each of the first light source modules and the second light source modules mentioned above includes two light sources and three light sources, such a configuration should not limit the scope of the claimed invention. A person having ordinary skill in the art may select proper numbers of the light sources according to actual requirements. For example, the numbers of the first light source module and the second light source module may be larger than three.

Figure 15:
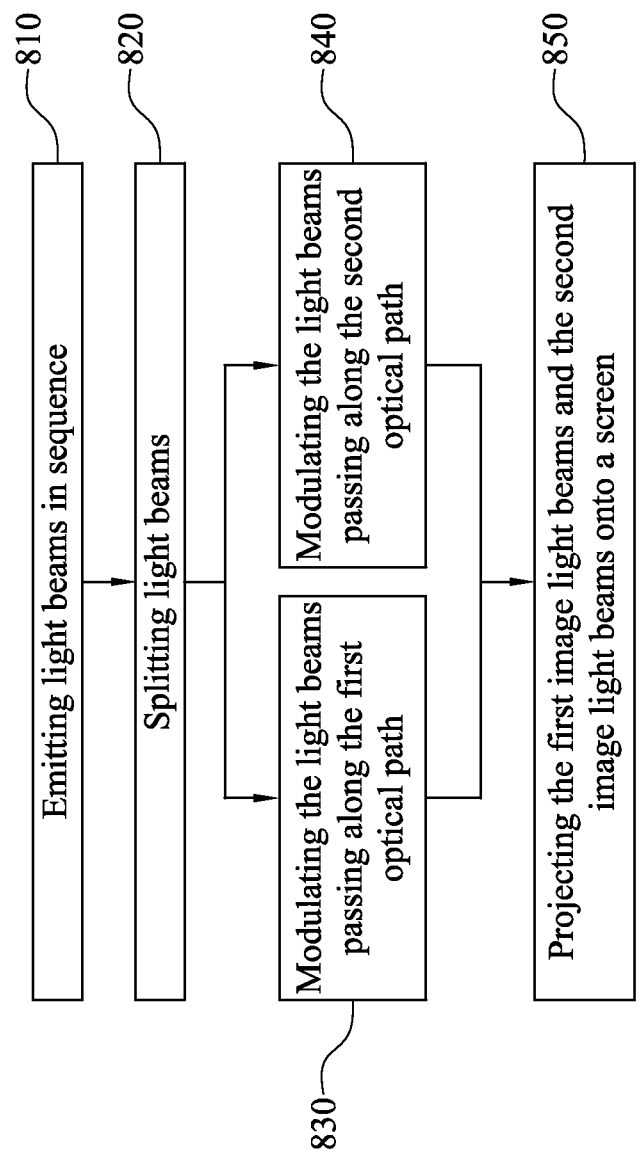
FIG. 15 is a flow chart of a display method according to one embodiment of the present invention.

Another aspect of the present invention provides a display method using the stereoscopic projection device mentioned above. FIG. 15 is a flow chart of the display method according to one embodiment of the present invention. First, in step 810, a plurality of light beams are emitted at different angles in time sequence. These light beams with different angles are later modulated to form image light beams with different view fields. In any time period, only one light source is turned on, while the other light sources are turned off to prevent crosstalk between images. The light beams can be made uniform after they are emitted from the light sources to obtain a better image quality. However, such operation should not limit the scope of the present invention.

Next, in step 820, the light beams are split using a dichroic mirror, such that one portion of each of the light beams is guided to a first optical path, and another portion of each of the light beams is guided to a second optical path. Therefore, a doubling of the number of the light beams and the number of the view fields are realized in a finite space.

In step 830, the portion of the light beams passing along the first optical path is modulated to form a plurality of a first image light beams with different images, and in step 840, the other portion of the light beams passing along the second optical path is modulated to form a plurality of a second image light beams with different images. Steps 830 and 840 can be performed simultaneously, step 830 can be performed before step 840, or step 830 can be performed after step 840, with such variations in the sequence of steps 830 and 840 all falling within the scope of the claimed invention.

Finally, in step 850, the first image light beams and the second image light beams are projected onto a screen, such that images with multi-views can be obtained in time sequence.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A stereoscopic projection device, comprising:
    a first light source module, comprising:
        a first light source for providing a first light beam;
        a second light source for providing a second light beam; and
        a first prism module for collecting the first light beam and the second light beam, wherein the first light beam and second light beam emit at different angles after passing through the first prism module;
    a second light source module, comprising:
        a third light source for providing a third light beam;
        a fourth light source for providing a fourth light beam; and
        a second prism module for collecting the third light beam and the fourth light beam, wherein the third light beam and the fourth light beam emit at different angles after passing through the second prism module;
    a dichroic mirror, wherein the first light source module and the second light source module are respectively disposed at different sides of the dichroic mirror, and the dichroic mirror splits the first light beam, the second light beam, the third light beam, and the fourth light beam into first portions and second portions, guides the first portions of the first light beam, the second light beam, the third light beam, and the fourth light beam to a first optical path, and guides the second portions of the first light beam, the second light beam, the third light beam, and the fourth light beam to a second optical path;
    a first optical module disposed on the first optical path for guiding and modulating the first portions of the first light beam, the second light beam, the third light beam, and the fourth light beam passing along the first optical path to form a plurality of first image light beams with different images;
    a second optical module disposed on the second optical path for guiding and modulating the second portions of the first light beam, the second light beam, the third light beam, and the fourth light beam passing along the second optical path to form a plurality of second image light beams with different images; and a beam-combining prism for guiding the first image light beams and the second image light beams to a lens.

2. The stereoscopic projection device of claim 1, wherein the first prism module comprises:

a first prism having a first incident surface and a first light emitting surface; and a second prism having a second incident surface and a first reflective surface, wherein the first prism and the second prism define a first gap therebetween, wherein the first light beam is incident to the first prism module from the first incident surface, and is reflected to the first light emitting surface by the first gap;

wherein the second light beam is incident to the first prism module from the second incident surface, is reflected by the first reflective surface, passes through the first gap, and reaches the first light emitting surface; and wherein an angle between the first light beam and a normal line of the first gap and an angle between the second light beam and the normal line of the first gap are different.

3. The stereoscopic projection device of claim 2, wherein an angle between the first reflective surface and the first gap is between 0 degrees and 10 degrees.

4. The stereoscopic projection device of claim 1, wherein the second prism module comprises:

a third prism having a third incident surface and a second light emitting surface; and a fourth prism having a fourth incident surface and a second reflective surface, wherein the third prism and the fourth prism define a second gap therebetween, wherein the third light beam is incident to the second prism module from the third incident surface, and is reflected to the second light emitting surface by the second gap;

wherein the fourth light beam is incident to the second prism module from the fourth incident surface, is reflected by the second reflective surface, passes through the second gap, and reaches the second light emitting surface; and wherein an angle between the third light beam and a normal line of the second gap and an angle between the fourth light beam and the normal line of the second gap are different.

5. The stereoscopic projection device of claim 4, wherein an angle between the second reflective surface and the second gap is between 0 degrees and 10 degrees.

6. The stereoscopic projection device of claim 1, wherein the first light source module further comprises a fifth light source for providing a fifth light beam, and the first prism module further collects the first light beam, the second light beam, and the fifth light beam, wherein the first light beam, the second light beam, and the fifth light beam emit at different angles after passing through the first prism module;

wherein the second light source module further comprises a sixth light source for providing a sixth light beam, and the second prism module further collects the third light beam, the fourth light beam, and the sixth light beam, wherein the third light beam, the fourth light beam, and the sixth light beam emit at different angles after passing through the second prism module;

wherein the dichroic mirror further guides portions of the fifth light beam and the sixth light beam to the first optical path, and guides other portions to the second optical path;

wherein the first optical module further guides and modulates the portions of the fifth light beam and the sixth light beam passing along the first optical path to form the first image light beams; and wherein the second optical module further guides and modulates the other portions of the fifth light beam and the sixth light beam to form the second image light beams.

7. The stereoscopic projection device of claim 6, wherein the first prism module comprises:

a first prism having a first incident surface and a first light emitting surface;

a second prism having a second incident surface, wherein the first prism and the second prism define a first gap therebetween; and a fifth prism having a fifth incident surface and a first reflective surface, wherein the second prism and the fifth prism define a third gap therebetween, wherein the first light beam is incident to the first prism module from the first incident surface, and is reflected to the first light emitting surface by the first gap;

wherein the second light beam is incident to the first prism module from the second incident surface, is reflected by the third gap, passes through the first gap, and reaches the first light emitting surface;

wherein the fifth light beam is incident to the first prism module from the fifth incident surface, is reflected by the first reflective surface, passes through the third gap and the first gap, and reaches the first light emitting surface; and wherein an angle between the first light beam and a normal line of the first gap, an angle between the second light beam and the normal line of the first gap, and an angle between the fifth light beam and the normal line of the first gap are different.

8. The stereoscopic projection device of claim 7, wherein an angle between the first gap and the third gap is between 0 degrees and 20/3 degrees, and an angle between the first reflective surface and the third gap is between 0 degrees and 20/3 degrees.

9. The stereoscopic projection device of claim 6, wherein the second prism module comprises:

a third prism having a third incident surface and a second light emitting surface;

a fourth prism having a fourth incident surface, wherein the third prism and the fourth prism define a second gap therebetween; and a sixth prism having a sixth incident surface and a second reflective surface, wherein the fourth prism and the sixth prism define a fourth gap therebetween, wherein the third light beam is incident to the second prism module from the third incident surface, and is reflected to the second light emitting surface by the second gap;

wherein the fourth light beam is incident to the second prism module from the fourth incident surface, is reflected by the fourth gap, passes through the second gap, and reaches the second light emitting surface;

wherein the sixth light beam is incident to the second prism module from the sixth incident surface, is reflected by the second reflective surface, passes through the fourth gap and the second gap, and reaches the second light emitting surface; and wherein an angle between the third light beam and a normal line of the second gap, an angle between the fourth light beam and the normal line of the second gap, and an angle between the sixth light beam and the normal line of the second gap are different.

10. The stereoscopic projection device of claim 9, wherein an angle between the second gap and the fourth gap is between 0 degrees and 20/3 degrees, and an angle between the second reflective surface and the fourth gap is between 0 degrees and 20/3 degrees.

11. The stereoscopic projection device of claim 1, wherein the first optical module comprises a first reflector, a first image modulator, and a first prism group, wherein the first reflector reflects the first portions of the first light beam, the second light beam, the third light beam, and the fourth light beam propagating from the dichroic mirror to the first prism group;

the first image modulator modulates the first portions of the first light beam, the second light beam, the third light beam, and the fourth light beam into the first image light beams; and the first prism group guides the first portions of the first light beam, the second light beam, the third light beam, and the fourth light beam propagating from the first reflector to the first image modulator, and guides the first image light beams to the beam-combining prism.

12. The stereoscopic projection device of claim 11, wherein the first optical module further comprises:

a first relay lens disposed between the dichroic mirror and the first reflector; and a second relay lens disposed between the first reflector and the first prism group.

13. The stereoscopic projection device of claim 12, wherein the first relay lens is divided into a first half portion and a second half portion, the first portions of the first light beam and the second light beam propagating from the dichroic mirror pass through the first half portion of the first relay lens, and the first portions of the third light beam and the fourth light beam propagating from the dichroic mirror pass through the second half portion of the first relay lens.

14. The stereoscopic projection device of claim 1, wherein the second optical module comprises a second reflector, a second image modulator, and a second prism group;

wherein the second reflector reflects the second portions of the first light beam, the second light beam, the third light beam, and the fourth light beam propagating from the dichroic mirror to the second prism group;

wherein the second image modulator modulates the second portions of the first light beam, the second light beam, the third light beam, and the fourth light beam into the second image light beams; and wherein the second prism group guides the second portions of the first light beam, the second light beam, the third light beam, and the fourth light beam propagating from the second reflector to the second image modulator, and guides the second image light beams to the beam-combining prism.

15. The stereoscopic projection device of claim 14, wherein the second optical module further comprises:

a third relay lens disposed between the dichroic mirror and the second reflector; and a fourth relay lens disposed between the second reflector and the second prism group.

16. The stereoscopic projection device of claim 15, wherein the third relay lens is divided into a third half portion and a fourth half portion, the second portions of the first light beam and the second light beam propagating from the dichroic mirror pass through the third half portion of the third relay lens, and the second portions of the third light beam and the fourth light beam propagating from the dichroic mirror pass through the fourth half portion of the third relay lens.

17. A display method, comprising:

emitting a plurality of light beams at different angles in time sequence;

splitting the light beams using a dichroic mirror for guiding portions of the light beams to a first optical path, and guiding other portions of the light beams to a second optical path;

modulating the portions of the light beams passing along the first optical path to form a plurality of first image light beams with different images;

modulating the other portions of the light beams passing along the second optical path to form a plurality of the second image light beams with different images; and projecting the first image light beams and the second image light beams to a screen.

18. The display method of claim 17, further comprising: making each of the light beams uniform.

* * * * *